(12) United States Patent
Takakura et al.

(10) Patent No.: US 6,885,776 B2
(45) Date of Patent: Apr. 26, 2005

(54) IMAGE MERGING APPARATUS

(75) Inventors: Hiroyuki Takakura, Kawasaki (JP);
Kenichiro Sakai, Kawasaki (JP);
Nobuyasu Yamaguchi, Kawasaki (JP);
Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 09/962,306

(22) Filed: Sep. 26, 2001

(65) Prior Publication Data

US 2002/0163530 A1 Nov. 7, 2002

(30) Foreign Application Priority Data

Apr. 5, 2001 (JP) .......................................... 2001-107532

(51) Int. Cl.$^7$ ............................. G06K 9/36; G06K 9/32; G09G 5/00; H04N 9/74
(52) U.S. Cl. ....................... 382/284; 382/294; 382/282; 345/629; 348/584
(58) Field of Search ................................. 382/284, 294, 382/282, 154; 345/629; 348/584; 358/450

(56) References Cited

U.S. PATENT DOCUMENTS

| | | | | |
|---|---|---|---|---|
| 6,078,701 A | * | 6/2000 | Hsu et al. ................... | 382/294 |
| 6,128,416 A | * | 10/2000 | Oura ........................... | 382/284 |
| 6,148,118 A | * | 11/2000 | Murakami et al. .......... | 382/284 |
| 6,292,593 B1 | * | 9/2001 | Nako et al. .................. | 382/284 |
| 6,507,415 B1 | * | 1/2003 | Toyoda et al. .............. | 358/450 |
| 6,516,087 B1 | * | 2/2003 | Camus ........................ | 382/154 |
| 2001/0017945 A1 | * | 8/2001 | Horie .......................... | 382/284 |

FOREIGN PATENT DOCUMENTS

| | | |
|---|---|---|
| JP | 5-067208 | 3/1993 |
| JP | 10-069536 | 3/1998 |
| JP | 11-017924 | 1/1999 |

* cited by examiner

Primary Examiner—Bhavesh M. Mehta
Assistant Examiner—John Strege
(74) Attorney, Agent, or Firm—Staas & Halsey LLP

(57) ABSTRACT

In the first stage, a merging position relationship (a rotation angle, and/or presence/absence of mirror image flipping) between two images is identified by using reduced images, and a rough overlapping region is detected. In the second stage, an exact overlapping position, an inclination, etc. are detected. In the third stage, the two images are merged by using the process results of the first and the second stages.

10 Claims, 27 Drawing Sheets

(1) READ IN VERTICAL DIRECTION (2) READ IN HORIZONTAL DIRECTION

IMAGE 2    IMAGE 1    IMAGE 2

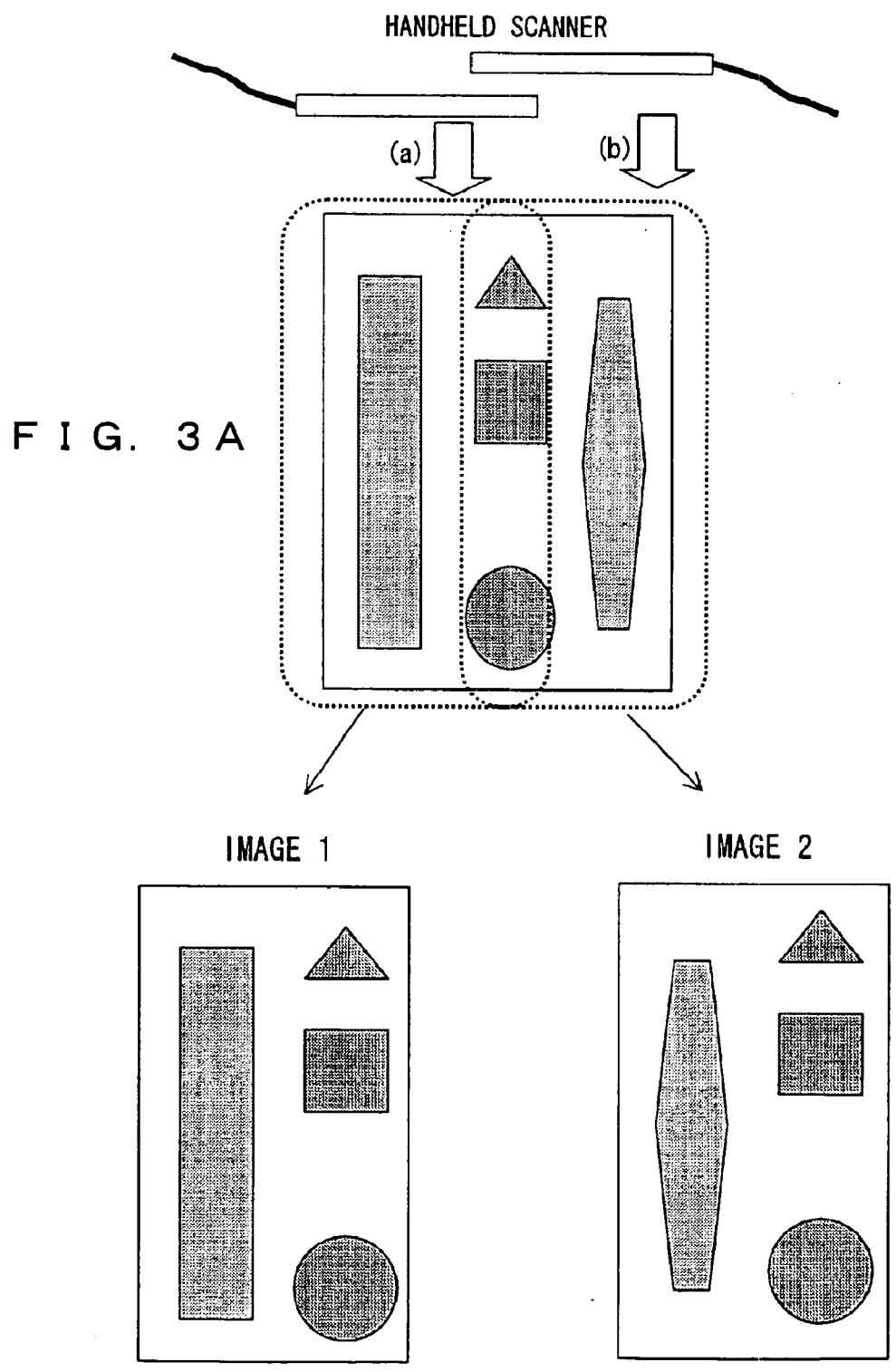

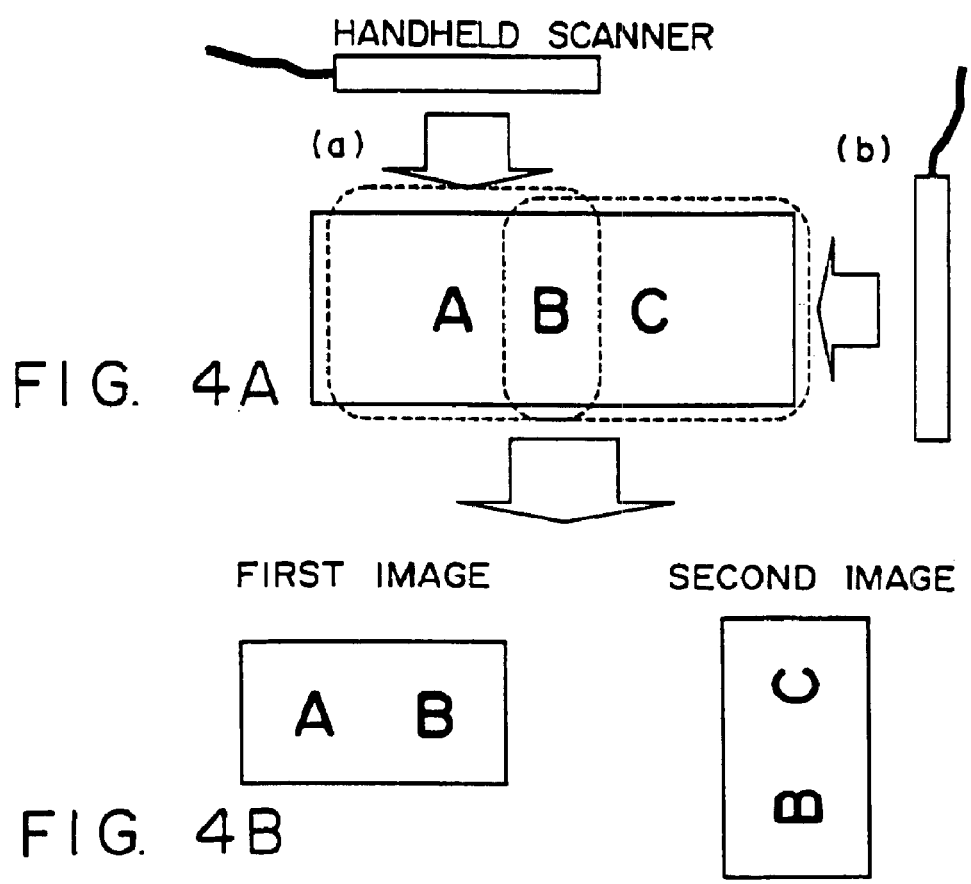

ImgGray1 (x, y) 11    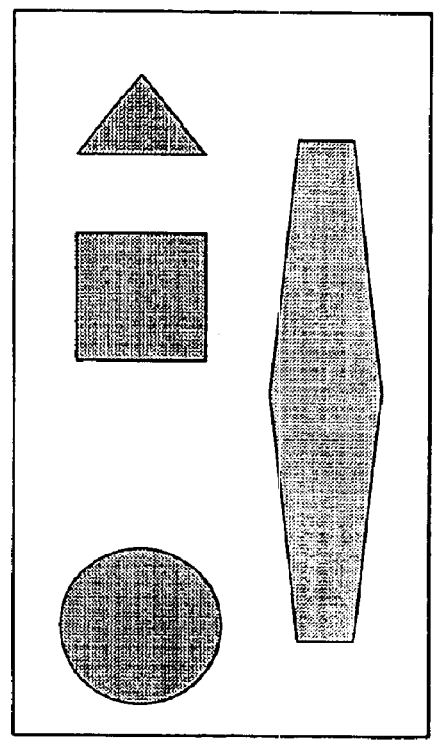ImgGray2 (x, y) 21
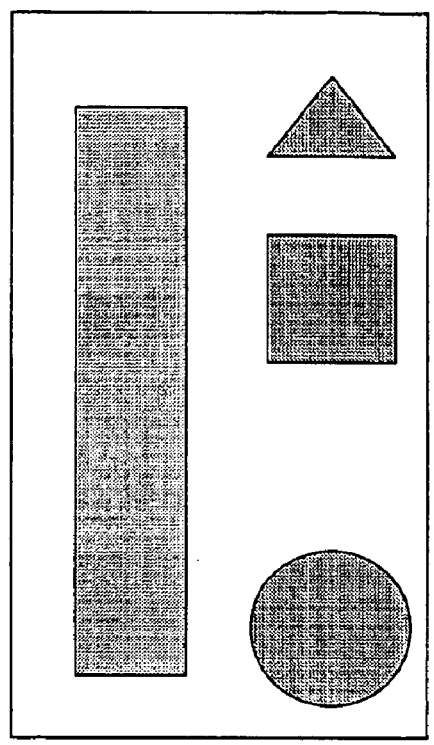
REDUCTION
ImgGray1' (x, y) 12    ImgGray2' (x, y) 22
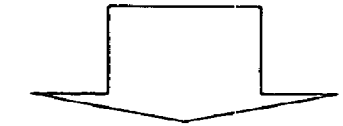
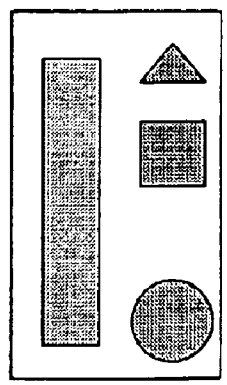
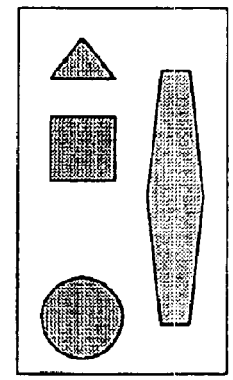
FIG. 8

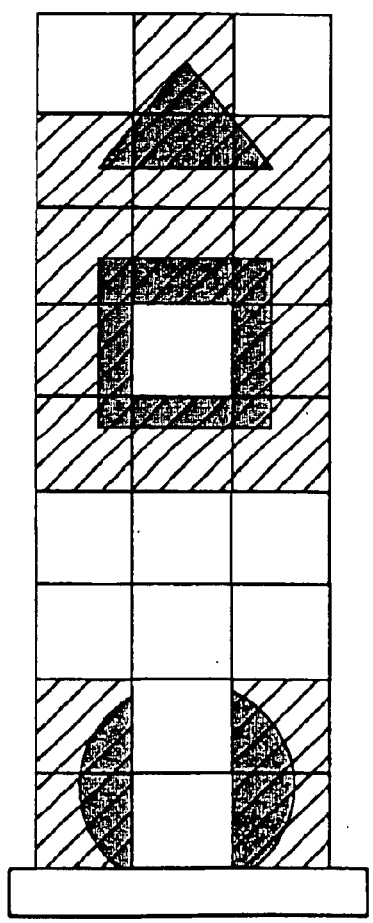
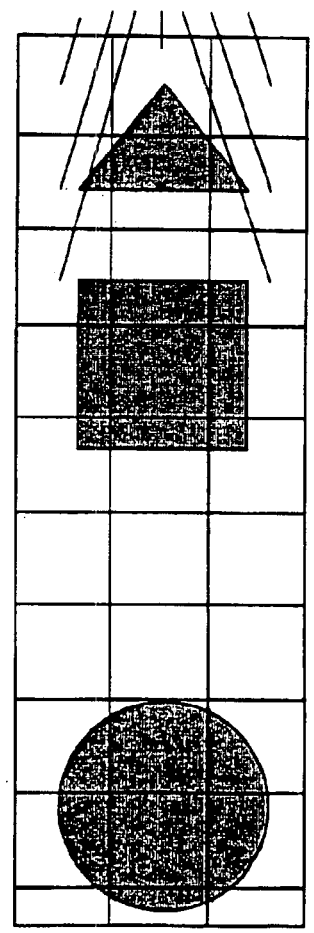
FIG. 14B — RECTANGULAR REGIONS INCLUDING DENSITY COMPONENTS HAVING LARGE COLOR DIFFERENCE
FIG. 14A — RECTANGULAR REGIONS
SELECTING BLOCKS

IMAGE MERGING APPARATUS

BACKGROUND OF THE INVENTION

1. Field of the Invention

The present invention relates to an apparatus merging images that are dividedly captured a plurality of times.

2. Description of the Related Art

In recent years, a manual hand-held scanner that is small and easy to carry has been developed and commercialized in addition to a stationary flatbed scanner. Since the body of a handheld scanner is small, a width that can be scanned at one time is narrow. To capture a large image exceeding a scanner width, the image must be dividedly captured a plurality of times, and merged. Or, there may be cases where a user dividedly scans an image a plurality of times although the image does not exceed a scanner width (since how to scan depends on a user, such a situation may occur).

Conventionally, there are several techniques for merging images that are dividedly captured a plurality of times. However, these techniques have a problem that a large memory capacity and a long time are required to merge full-color images. A throughput of a PC (Personal Computer: particularly a notebook computer, or a portable information processing device such as a PDA, a handheld PC, etc.) has been improving. However, also a data amount of an image has been increasing to enhance an image quality. Therefore, it is essential to reduce a memory capacity and a processing time.

A known merging technique for a panoramic photo, etc. reduces a processing time to some extent by limiting a merging plane to the right or the left with respect to an erect image.

However, with a handheld scanner, a user can read an image in any direction toward a paper sheet (FIGS. 1A, 1B, 2A, and 2B). Therefore, an input image is flipped to a mirror image (FIGS. 3A and 3B), and/or rotated depending on a capturing direction of the image. As a result, a long time is required to detect a position at which two images overlap.

Assume that a user performs first scanning with a handheld scanner from the top to the bottom of a drawing as shown in (a) of FIG. 4A, and also performs second scanning from the right to the left of the drawing as shown in (b) of FIG. 4. In this case, two image data (the first and the second images) input to a side of an information processing terminal (the above described PC (particularly, a notebook computer, or a portable information processing device such as a PDA, a handheld PC, etc.), which is connected to the handheld scanner, become those shown in FIG. 4B.

In such a case, the second image is first moved upward, downward, right, and left with respect to the first image as shown in FIG. 5A (as a matter of course, the second image may be inversely moved to upward, downward, right, or left with respect to the first image), and attempts are made to detect an overlapping position. Naturally, however, the attempts result in failure.

Accordingly, as shown in FIG. 5B, the second image is next rotated (90 degrees in this case) and moved upward, downward, right, or left with respect to the first image, and attempts are again made to detect an overlapping position in a similar manner as in the above described case. This time, an overlapping position can be detected when the second image is moved to the right side of the first image (FIG. 5C).

In this example, the overlapping position can be detected when the second image is rotated 90 degrees. However, an overlapping position cannot be detected in some cases unless the image is further rotated (by 180, 270 degrees). Additionally, if an overlapping position cannot be detected (that is, the image is flipped to a mirror image) although the image is rotated at all of rotation angles (0, 90, 180, and 270 degrees), attempts must be again made to detect an overlapping position at the rotation angles of 0, 90, 180, and 270 degrees after the second image is flipped to a mirror image.

As described above, a lot of memory capacity and processing time are required to detect an overlapping position of two images. Namely, since 4 determinations of whether or not an overlapping position is detected at respective rotation angles of an input image (0, 90, 180, and 270 degrees) must be made, and/or 2 determinations of whether or not an image is flipped to a mirror image must be also made. As a result, a lot of memory capacity and processing time are required to detect an overlapping position by making 8 determinations (4 determinations for the rotation angles×2 determinations for the presence/absence of mirror image flipping) (or 32 determinations if detections for upward, downward, right, and left positions shown in FIG. 5A are included).

A conventional solution to such a problem is to detect a move amount and a proceeding direction of a scanner by using dedicated hardware, and to use the detected amount and direction for image merging. With this method, however, the cost, the size, and the weight of a scanner increase due to an addition of the hardware for making such detection.

The same thing can be said also for a merging technique of a panoramic photo, if it is not assumed that a merging plane is limited to the right or the left with respect to an erect image (strictly speaking, this may not be a panoramic photo. However, the present invention targets not only image data read by a handheld scanner, but also image data that a user freely captures without being limited to the right or the left, for example, with a digital camera, a digital video camera, etc.

Furthermore, a joint is conventionally conspicuous in some cases.

SUMMARY OF THE INVENTION

An object of the present invention is to provide an image merging apparatus that can reduce a memory capacity required for processing, and can automatically merge two images at high speed without using hardware for detecting the move amount or the proceeding direction of a scanner, even if a second image is flipped to a mirror image and/or rotated relatively to a first image.

Another object of the present invention is to provide an image merging apparatus that makes a joint inconspicuous.

A first image merging apparatus according to the present invention is an apparatus merging input images that are dividedly read a plurality of times from an input device. This apparatus comprises: a first overlapping position detecting unit generating image data whose data amounts are made smaller than the plurality of pieces of read input image data, and detecting a merging position relationship and a rough overlapping region of the plurality of input images by using the generated image data; and an image merging unit merging the plurality of input images based on the merging position relationship and the rough overlapping region, which are detected by the first overlapping position detecting unit.

When a user dividedly and arbitrarily captures images a plurality of times, for example, with a handheld scanner, a merging position relationship (presence/absence of mirror image flipping, and a rotational angle) (also an upward, downward, right, and left position relationship) is not learned.

With the above described image merging apparatus, a merging position relationship is detected with image data whose data amount is reduced, for example, a reduced input image, etc. by means of the first overlapping position detecting unit (the upward, downward, right, and left position relationship is proved from a rough overlapping position). Therefore, it is sufficient for the image merging unit only to merge input images by flipping an input image back from a mirror image or rotating the image depending on need with the use of a detection result, thereby speeding up processing, and reducing a memory capacity required for the processing.

A second image merging apparatus according to the present invention is an apparatus merging input images that are dividedly captured a plurality of times from an input device. This apparatus comprises: a first overlapping position detecting unit detecting a rough overlapping region of the plurality of pieces of read input image data; a second overlapping position detecting unit dividing the rough overlapping position detected by the first overlapping position detecting unit into a plurality of rectangular regions, and extracting a rectangular region used to detect an exact overlapping position, and a rectangular region used as a merging plane; and an image merging unit determining the exact overlapping position of the plurality of input images, and merging the plurality of images by synthesizing the plurality of input images in the rectangular region used as the merging plane.

With the second image merging apparatus, a rectangular region selected from among rectangular regions including, for example, many density components having a small color difference is used as a merging plane without utilizing a rectangular region used to detect an exact overlapping position as a merging plane unchanged, whereby the merging process can be performed without making a joint conspicuous.

A third image merging apparatus according to the present invention is an apparatus merging input images that are dividedly read a plurality of times from an input device. This apparatus comprises: a first overlapping position detecting unit temporarily storing the plurality of pieces of input image data, generating image data whose data amount is made smaller than the input image data, and detecting a merging position relationship and a rough overlapping position of the plurality of input images by using the generated image data; a second overlapping position detecting unit dividing into a plurality of rectangular regions a region corresponding to the rough overlapping position detected by the first overlapping position detecting unit with the use of grayscale image data having a single color component, into which each of the pieces of read image data is converted, and extracting a rectangular region used to detect an exact overlapping position and a rectangular region used as a merging plane of the images from the plurality of rectangular regions; and an image merging unit determining an exact overlapping position of the plurality of input images by using the rectangular region used to detect the exact overlapping position, which is detected by the second overlapping position detecting unit, and merging the plurality of images by synthesizing the plurality of input images in the rectangular region used as the merging plane of the images.

With the third image merging apparatus, the first overlapping position detecting unit first detects a merging position relationship (the presence/absence of mirror image flipping, and a rotation angle), and a rough overlapping region by using image data whose data amount is reduced, for example, a reduced grayscale image of an input image, the second overlapping position detecting unit extracts a rectangular region used to detect an exact overlapping position, and a rectangular region used as an image merging plane by using grayscale image data having a single color component, into which the input image data is converted, and the image merging unit can only merge the images by using the process results of the first and the second overlapping position detecting units when performing the process for input images whose data amounts are large, whereby the processing can be made faster, and a memory capacity required for the processing is reduced. Furthermore, the image merging process can be performed without making a joint conspicuous, even if merging planes do not completely match. This produces a significant effect particularly when an input image is full-color.

BRIEF DESCRIPTION OF THE DRAWINGS

FIGS. 3A and 3B show an example where an image is flipped to a mirror image;

FIGS. 4A and 4B are diagrams for explaining the case where one image is rotated with reference to another depending on a user operation;

FIG. 8 is a conceptual drawing of generating a reduced image;

FIG. 14A shows an overlapping region divided into a plurality of rectangular regions;

FIG. 14B shows an example where a rectangular region including density components having a large color difference is extracted from the rectangular regions shown in FIG. 14A;

DESCRIPTION OF THE PREFERRED EMBODIMENTS

Hereinafter, a preferred embodiment according to the present invention is explained with reference to the drawings.

The preferred embodiment stated below refers to the case where two images are merged. The present invention, however, is not limited to two images, and applicable to the case where three or more images are merged.

Figure 6:
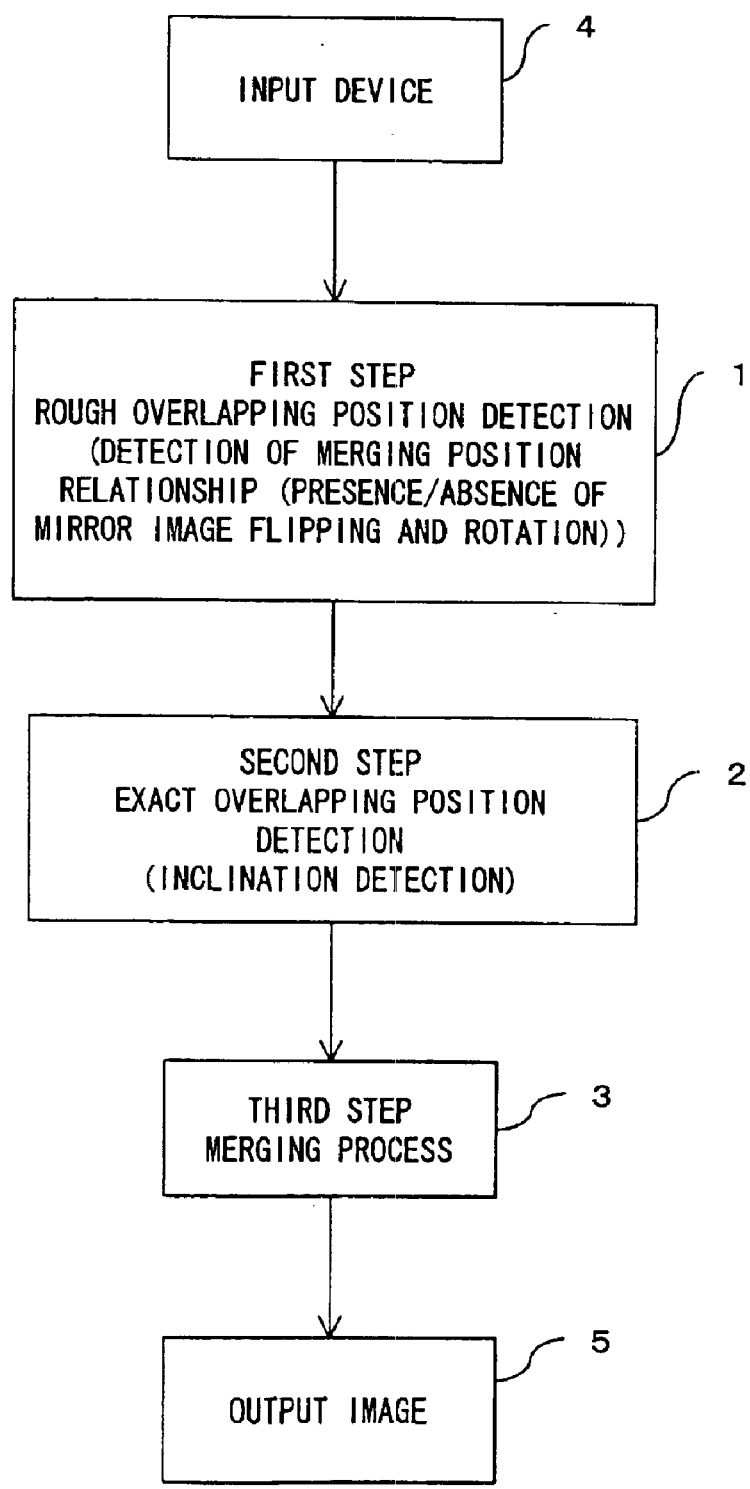
FIG. 6 is a block diagram showing the principle of the present invention.

FIG. 6 is a block diagram showing the principle of the present invention.

The present invention is composed of 3 principal steps (process steps).

Since a handheld scanner is manually operated as described above, a user can read an image in any direction toward a paper sheet. Therefore, an input image is sometimes flipped to a mirror image and/or rotated (by 90, 180, or 270 degrees) depending on an image capturing direction (furthermore, an overlapping position must be detected by shifting one image upward, downward, right, and left with respect to another image), so that a lot of processing time is required to detect an overlapping position.

In this preferred embodiment, an image merging process is divided into 3 steps in order to address such a problem.

Figure 5A:
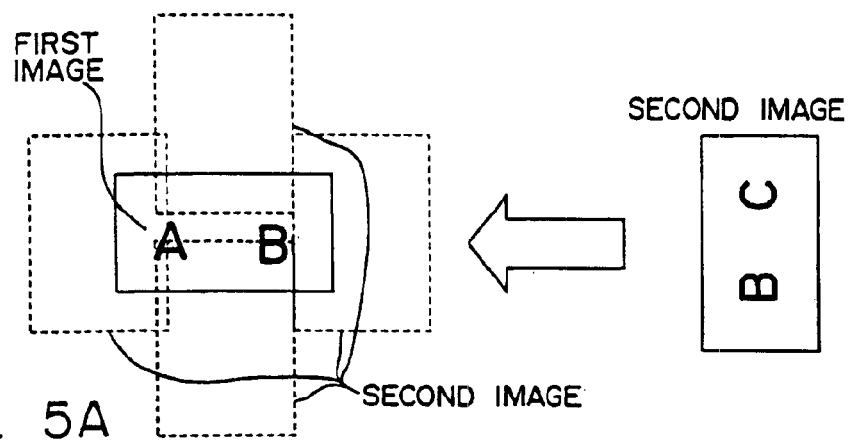
FIGS. 5A, 5B, and 5C show the states where an overlapping position of two images is detected in the cases of FIGS. 4A and 4B.
Figure 5B:
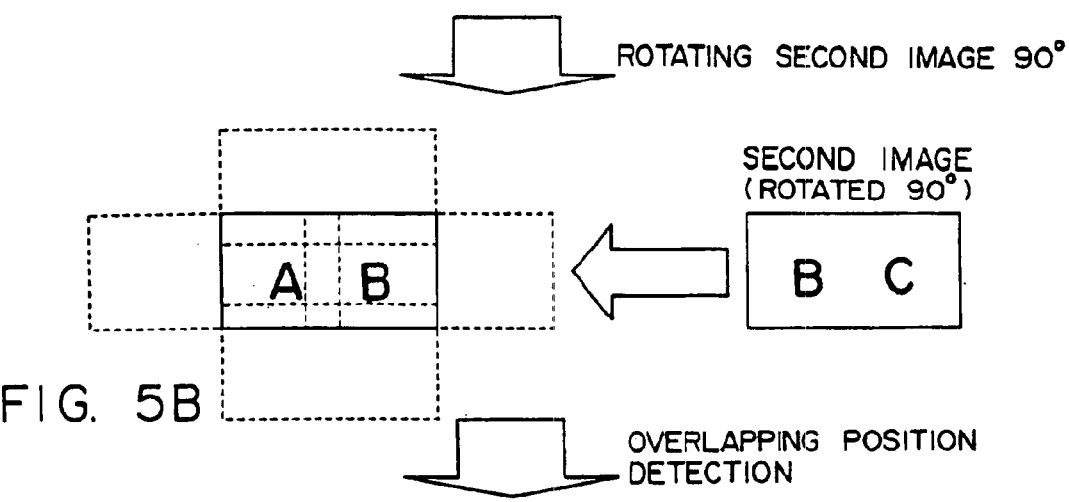
Figure 5C:
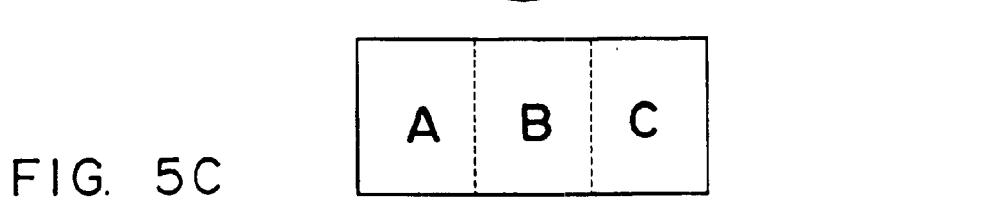
Figure 11:
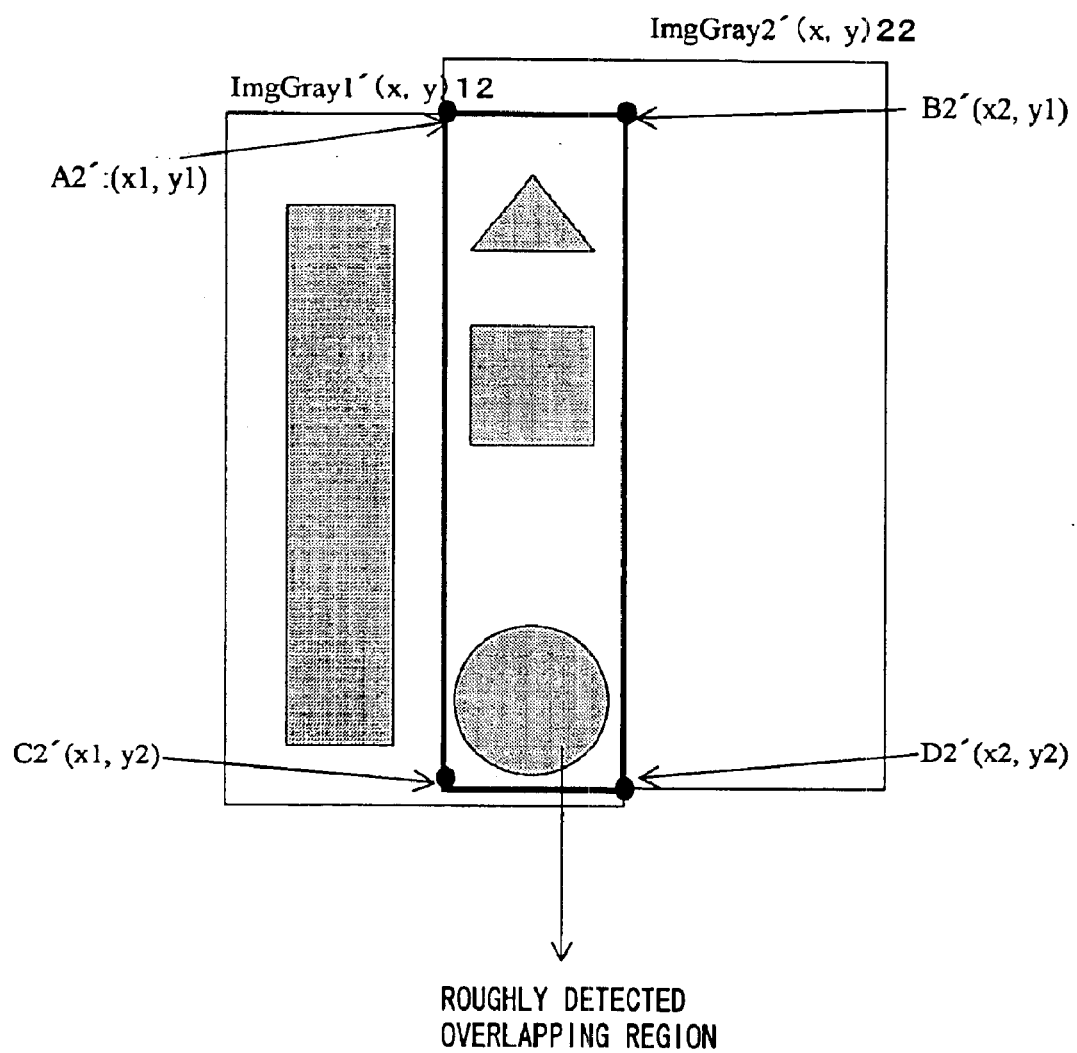
FIG. 11 exemplifies coordinate data of a rough overlapping region detected by using a reduced image.

In the "rough overlapping position detection" 1 in the first step, a merging position relationship (the above described rotation angles, and/or the presence/absence of mirror image flipping) of two images is detected by using image data (such as reduced grayscale images having a single color component), which are input by an input device 4 such as a handheld scanner, etc., and whose data amounts are reduced. Furthermore, a rough overlapping region of the two images having the detected merging position relationship is detected (for example, a region that is shown in FIG. 11 and will be described later/and its coordinate data). Note that the concept including the entire process performed in the first step is also referred to as "rough overlapping position detection" 1. The upward, downward, right, and left position relationship, which is shown in FIG. 5A, is learned from the coordinate data of a "rough overlapping region".

As described above, this preferred embodiment has a first characteristic such that a merging position relationship between two images (a rotation angle, and/or the presence/absence of mirror image flipping) is identified by using reduced images whose data amounts are very small (if scanned images are color images, these images are converted into grayscale images having a single color component, and their reduced images (reduced grayscale images) are used), so that a "rough overlapping region" is detected.

Because the data amount of scanned image data is large as it is (particularly, the data amount of a full-color image is very large), a lot of processing time/memory capacity are required if the processing is performed with the scanned data. In this preferred embodiment, however, the processing is divided into a plurality of steps, and the process that is limited to the identification of a merging position relationship between two images and the detection of a "rough overlapping region" by using reduced images the data amounts of which are small in the first stage, thereby speeding up the entire processing, and reducing a memory capacity required for the processing.

Next, a "exact overlapping position detection" 2 process of two images is performed in the second step.

Here, if scanned images are full-color images, image data obtained by converting the scanned images into grayscale images are used. Then, an exact overlapping position and region used as a merging plane (a joint used for a synthesis process) are detected based on the "rough overlapping region" detected in the first step. This is implemented by dividing the rough overlapping region into a plurality of rectangular regions, by determining a region used to detect an exact overlapping position from among rectangular regions including many density components having a large color difference, and by determining a rectangular region used as a merging plane of the two images from among rectangular regions including many density components having a small color difference.

This preferred embodiment has a second characteristic such that an image joint is made inconspicuous by selecting a rectangular region used as a merging plane from among rectangular regions including many density components having a small color difference.

Furthermore, the inclination of the second scanned image (hereinafter referred to as the second image) relatively to the first scanned image (hereinafter referred to as the first image) is detected by using rectangular regions divided as described above.

Then, in the third step, a process using the scanned images the data amounts of which are large (full-color images, etc.) is performed for the first time. Since a merging position relationship (a rotation angle, and/or the presence/absence of mirror image flipping), an inclination, an exact overlapping position, and a rectangular region used as a merging plane are learned from the results of the processes performed in the first and the second steps, the two images are merged by using these results. Then, an output process such as displaying, printing, or storing in a storage device the merged image as an output image 5 is performed.

If this preferred embodiment is configured to allow a user to input/set the scanning direction of a handheld scanner, the processing time can be reduced. This is because the image merging plane can be identified. If precedence is given to the processing speed, this preferred embodiment may be configured to make a user input/specify the scanning direction. However, a user load increases in this case.

This preferred embodiment provides an apparatus with which a user can perform scanning in his or her desired direction without increasing a user load, and two images are merged by being automatically corrected on an apparatus side at high speed (and with a considerably small memory capacity).

Figure 7:
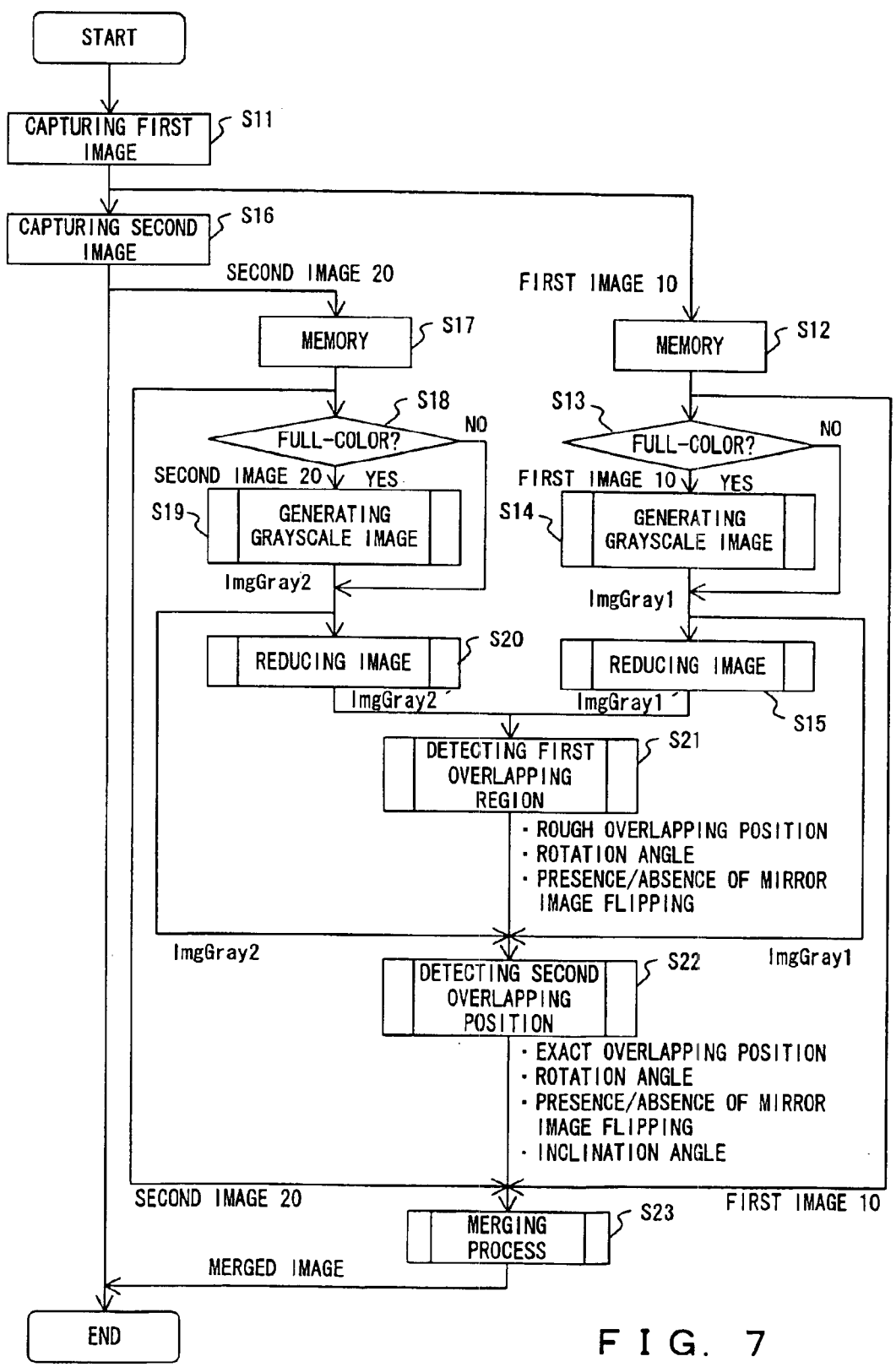
FIG. 7 is a flowchart showing the outline of the entire process performed by an image merging apparatus according to a preferred embodiment.

FIG. 7 is a flowchart showing the outline of the entire processing performed by the image merging apparatus according to this preferred embodiment.

In this figure, first image data (the first image data 10) captured by an input device (a manual handheld scanner of a small size is assumed in this preferred embodiment. However, a digital camera, a digital video camera, etc. maybe available) is once stored in a memory (step S11). Next, the first image data 10 stored in the memory is read out. If the read memory is a color image having RGB color components (particularly, a full-color image) ("YES" in step S13), this image is converted into a grayscale image having a single color component (step S14). For the grayscale image generation, the YCbCr conversion is used in this preferred embodiment. By way of example, a grayscale image is generated by focusing on the Y component of the YCbCr conversion. If an input image is an image having a single color component ("NO" in step S13), there is no need to perform conversion. The grayscale image data of the first image data 10 is hereinafter denoted as ImgGray1(x,y) 11. By taking advantage of a grayscale image having a single color component, a memory capacity used can be reduced, and the processing can be performed at higher speed than in the case where the processing is performed with an image having a plurality of color components.

For the grayscale image generation, by way of example, a method generating an image having a differential value as a pixel component by using a difference filter, a method using one of RGB color components as a grayscale image, or other conversion methods may be available in addition to the above described method.

Next, in step S15, ImgGray1(x,y) 11 is geometrically reduced and converted. Here, a reduced image is generated by averaging values of a plurality of pixel components. Assuming that a reduction ratio is 1/n, the average value of a region of "n (x direction)×n (y direction)" is defined to be a pixel component. The reduced grayscale image data of the first image data is hereinafter denoted as ImgGray1'(x,y) 12. By taking advantage of a reduced image, a memory capacity used is reduced, and the processing can be performed at high speed.

Then, the second image data (the second image data 20) is captured from the input device (step S16), and a process similar to that for the above described first image data is performed.

Namely, the second image data 20 is once stored in the memory (step S17). The second image data 20 stored in the memory is read out. If this image data is a color image ("YES" in step S18), it is converted into a grayscale image having a single color component (step S19).

The grayscale image of the second image data 20 is hereinafter denoted as ImgGray2(x,y) 21.

Then, ImgGray2(x,y) 21 is geometrically reduced similar to the first image, and a reduced image (hereinafter denoted as ImgGray2'(x,y) 22) is generated.

FIG. 8 is a conceptual drawing of the above described reduced image generation.

Next, these two reduced images (ImgGray1'(x,y) 12 and ImgGray2'(x,y) 22) are passed to step S21 as arguments. In step S21, the merging position relationship (a relative rotation angle, and/or the presence/absence of mirror image flipping) of the second image with respect to the first image is detected. Furthermore, a rough overlapping region of the two images having this merging position relationship is detected.

Next, the rough overlapping region is divided into a plurality of rectangular regions by using the grayscale images having a single color component (ImgGray1(x,y) 11 and ImgGray2(x,y) 21) and a detection result of step S21, and a rectangular region used to detect an exact overlapping position and that used as a merging plane are extracted. Furthermore, an inclination angle of the second image with respect to the first image is calculated depending on need (step S22).

Then, the two input images (full color images, etc.), that is, the first and the second images, which are stored in the memory, are read out. The two input images can be accurately merged without making a joint conspicuous while correcting the mirror image flipping, the rotation, and the inclination by using various types of data such as the rotation angle, the presence/absence of mirror image flipping, the rectangular region used to detect an exact overlapping position, the rectangular region used as a merging plane, the inclination angle, etc., which are obtained with the above described processes performed in steps S21 and S22 (step S23). The merged image is output, and the processing is terminated.

Figures 1A, 1B:
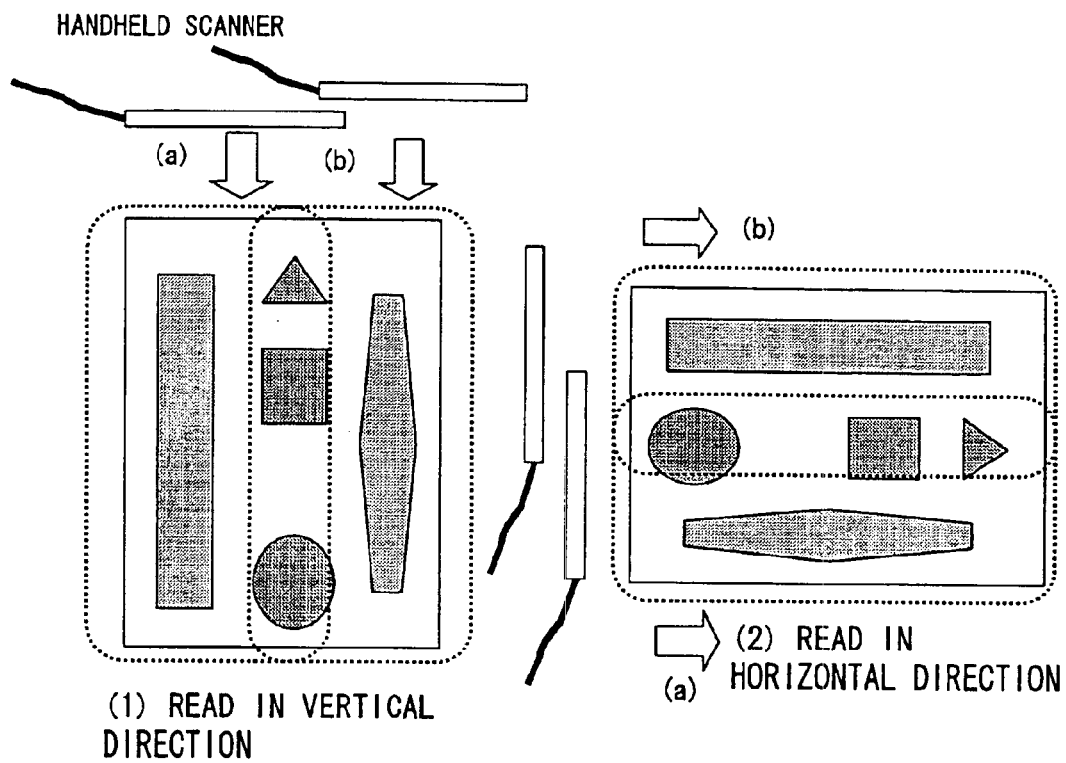
FIGS. 1A and 1B show the state where a merging position relationship of two images varies depending on a user operation (No. 1)
Figure 2A:
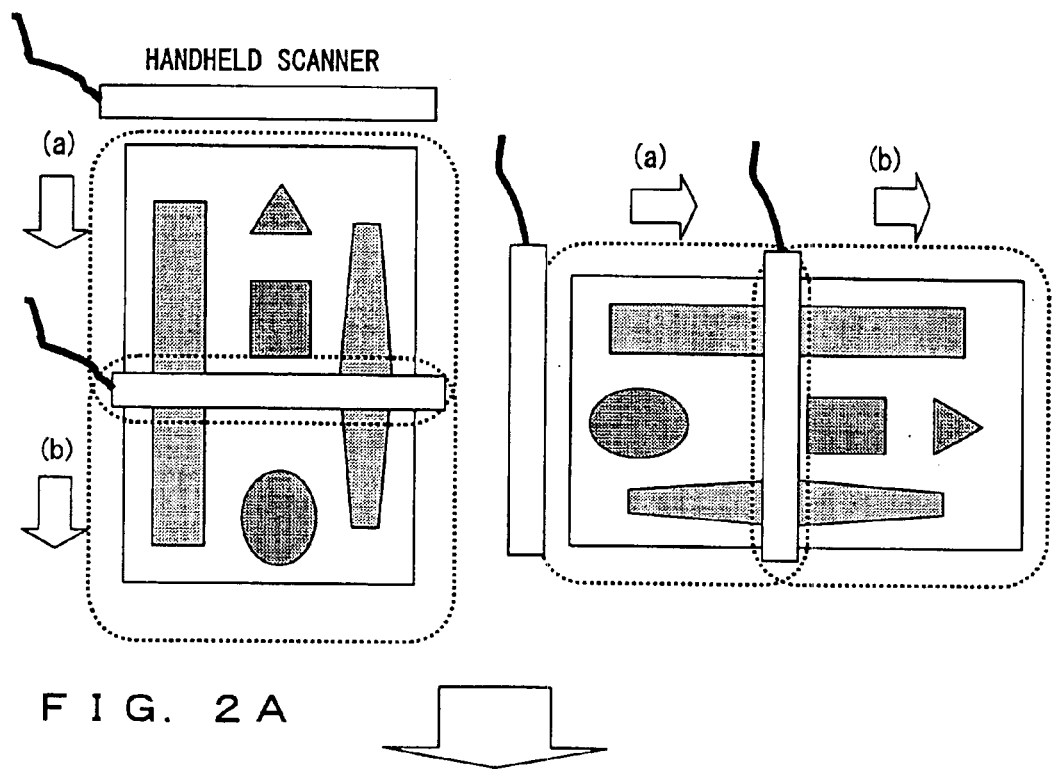
FIGS. 2A and 2B show the state where the merging position relationship of two images varies depending on a user operation (No. 2)
Figure 2B:
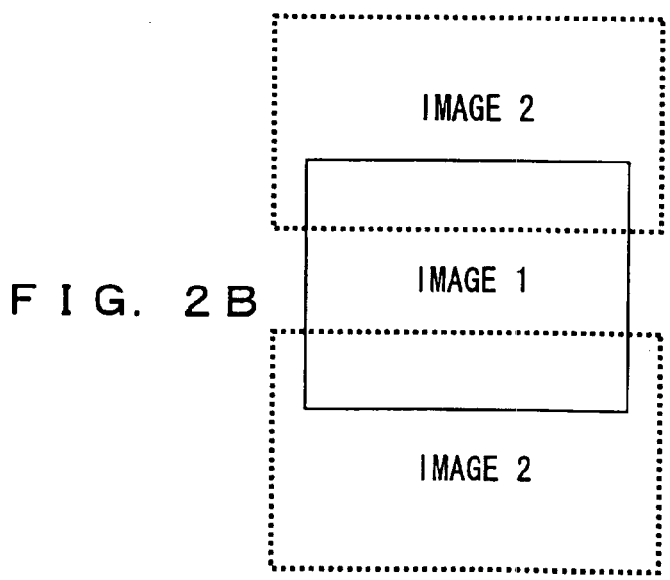

Details of the above described processes performed in steps S21, S22, and S23 are described below. The following description is provided by taking as an example two images that are captured by being scanned in the vertical direction as shown in (1) of FIG. 1A.

Figure 9:
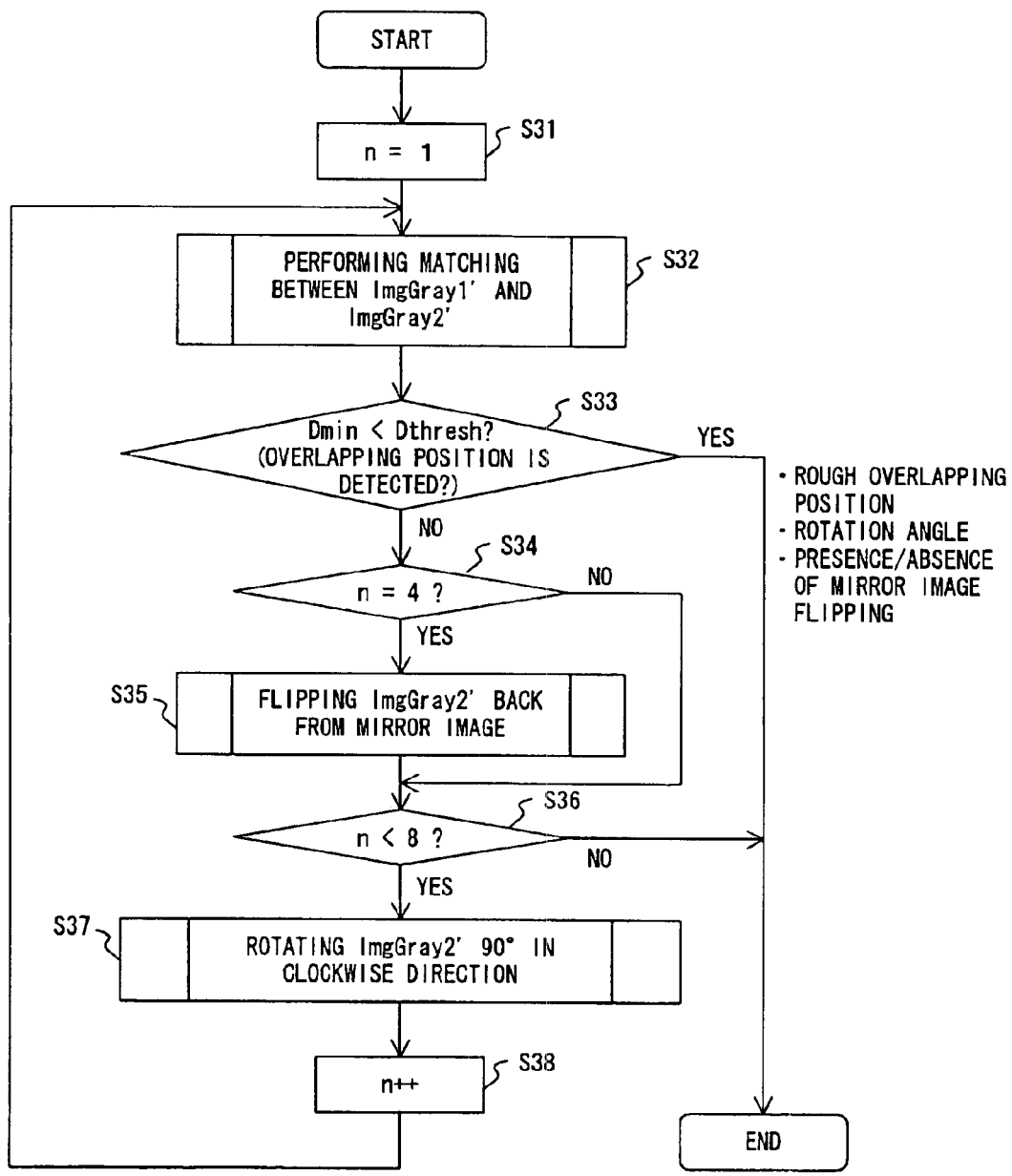
FIG. 9 is a flowchart showing the details of the process performed in step S21 of FIG. 7.

FIG. 9 is a flowchart showing the details of the process performed in step S21.

The reduced images ImgGray1'(x,y) 12 and ImgGray2'(x,y) 22, which are obtained by reducing the grayscale images having a single color component, are received as arguments, as described above.

Firstly, a variable n is initialized (n=1) (step S31). Since a handheld scanner is manually operated, a scanned image is sometimes flipped to a mirror image, or rotated depending on a scanning direction. Namely, there are a total of 8 possible overlapping positions such as the (4) rotation angles of the second image with respect to the first image×the presence/absence of mirror image flipping.

Here, assume that n=1 to 4 indicate the above described 4 rotation angles with respect to an erect image, and n=5 to 8 indicate the above described 4 rotation angles with mirror image flipping.

Accordingly, a matching is performed between the two images by using the reduced images ImgGray1'(x,y) 12 and ImgGray2'(x,y) 22 at one of the 4 rotation angles with respect to an erect image (step S32), and it is determined whether or not an overlapping position can be detected (step S33).

Specifically, the rotation angle of ImgGray2'(x,y) 22 is assumed to be a rotation angle (such as 0 degree) indicated by n=1, ImgGray2'(x,y) 22 is moved to upward, downward, right, and left positions of ImgGray1'(x,y) 12, and a pixel matching is performed while shifting ImgGray2'(x,y) upward, downward, right, and left at each of the positions.

Figure 10:
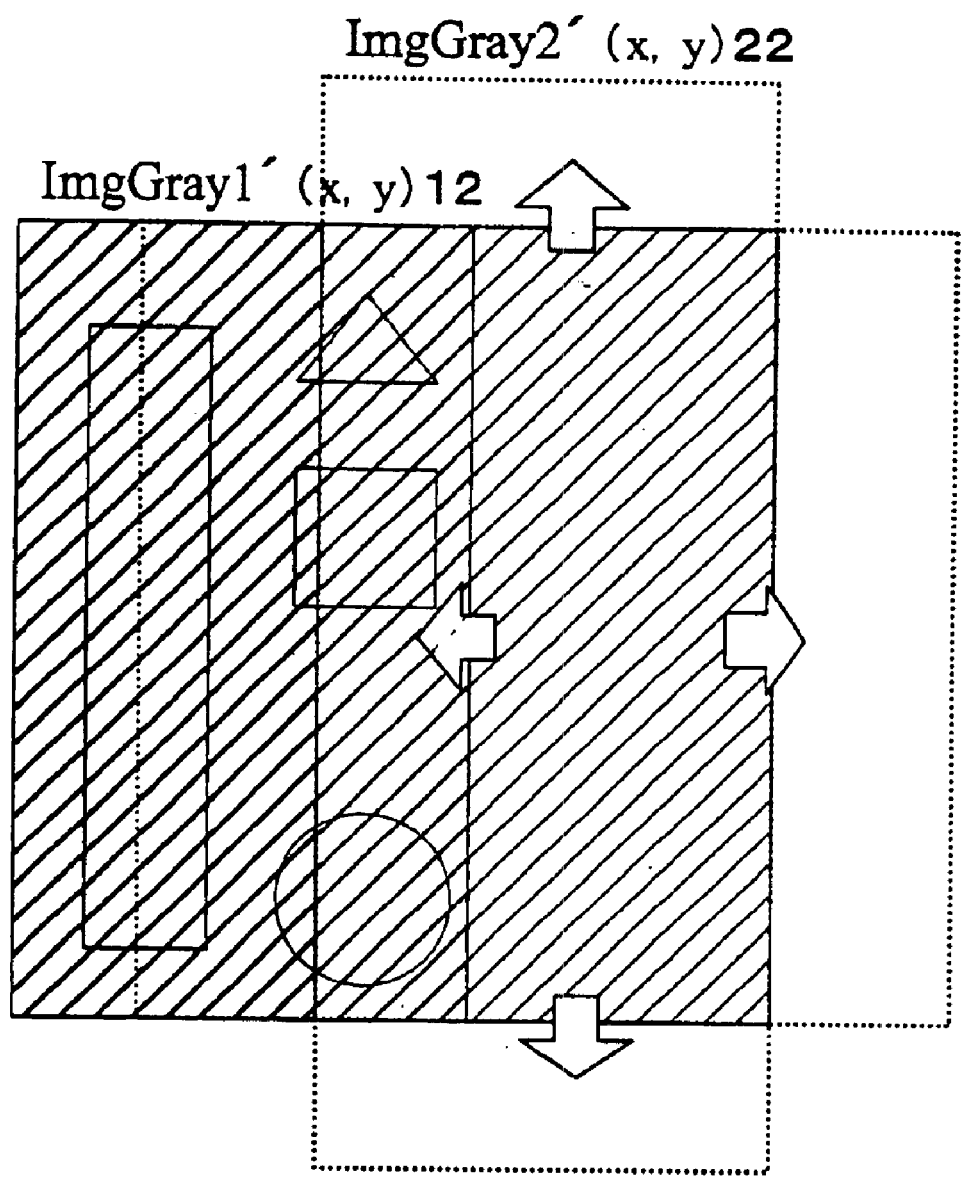
FIG. 10 shows the state where a rough overlapping region is detected by using a reduced image.

Here, "shifting upward, downward, right, and left" is different from "moving to upward, downward, right, and left positions". For instance, FIG. 10 exemplifies the state where a pixel matching is performed while shifting ImgGray2'(x,y) 22 upward, downward, right, and left after ImgGray2'(x,y) 22 is moved to the right position of ImgGray1'(x,y) 12.

At this time, the image may be shifted in units of not one pixel but several pixels. Since there is no need to detect an exact overlapping position here, the process can be performed at higher speed by shifting the image in units of not one but several pixels. As a matching technique, Hamming distance, Euclidean distance, etc. is used, and a position whose distance becomes the minimum is defined to be an overlapping region. However, if a minimum distance Dmin, which is obtained at a rotation angle to be processed at this time, does not become equal to or smaller than a certain threshold value (Dthresh) ("NO" in step S33), it is recognized that an overlapping position is not detected. The process then transfers to another rotation angle (or mirror image flipping). (The matching method is not limited to the above described example. Other methods (such as DP matching, etc.) may be available. Additionally, the threshold value (Dthresh) is set to a value such that the minimum distance Dmin becomes equal to or smaller than the threshold vale (Dthresh) only if the matching process is performed at a correct rotation angle (and for the presence/absence of mirror image flipping)).

In the exemplified process, if an overlapping region is not detected ("NO" in step S33), either of the reduced images is rotated (ImgGray2'(x,y) 22 is assumed to be rotated 90 degrees in a clockwise direction in this example) (step S37). At the same time, the value of n is incremented, and an overlapping region is searched with the above described processes in steps S32 and S33.

However, if the value of n is 4 ("YES" in step S34), ImgGray2'(x,y) 22 is flipped back from a mirror image. If n=8 ("NO" in step S36), the process is terminated (the process is aborted in this case).

Namely, the number of rotation angles of an image with the presence/absence of mirror image flipping is 8. If an overlapping region is not detected with the process for the respective rotation angles (0, 90, 180, and 270 degrees) when n=1 to 4, mirror image flipping is performed after the process for n=4. Whether or not an overlapping region exists is examined also for the cases of the mirror image flipping and the rotation angles (0, 90, 180, and 270 degrees) when n=5 to 8.

If an overlapping region is found ("YES" in step S33), the rotation angle at that time (any of 0°, 90°, 180°, and 270°) and data of the presence/absence of mirror image flipping are output. At the same time, coordinate data of the roughly detected overlapping region is output. At this time, the coordinate data of ImgGray1'(x,y) 21 and ImgGray2'(x,y) 22 are respectively obtained. Supposing that an overlapping region shown in FIG. 11 is detected, for example, (A2'(x1, y1), B2'(x2,y1), C2'(x1,y2), D2'(x2,y2)) are output as the coordinate points of the overlapping region of ImgGray2' (x,y) 22 as shown in this figure.

As described above, input images (full-color images, etc.) are converted into grayscale image data having a single color component, which are then reduced, and a matching is performed for the reduced images in units of several pixels, whereby a rough overlapping position of the images can be quickly detected with a small memory capacity at high speed.

Next, details of the process performed in the second step (the process in step S22) are described below.

Figure 12:
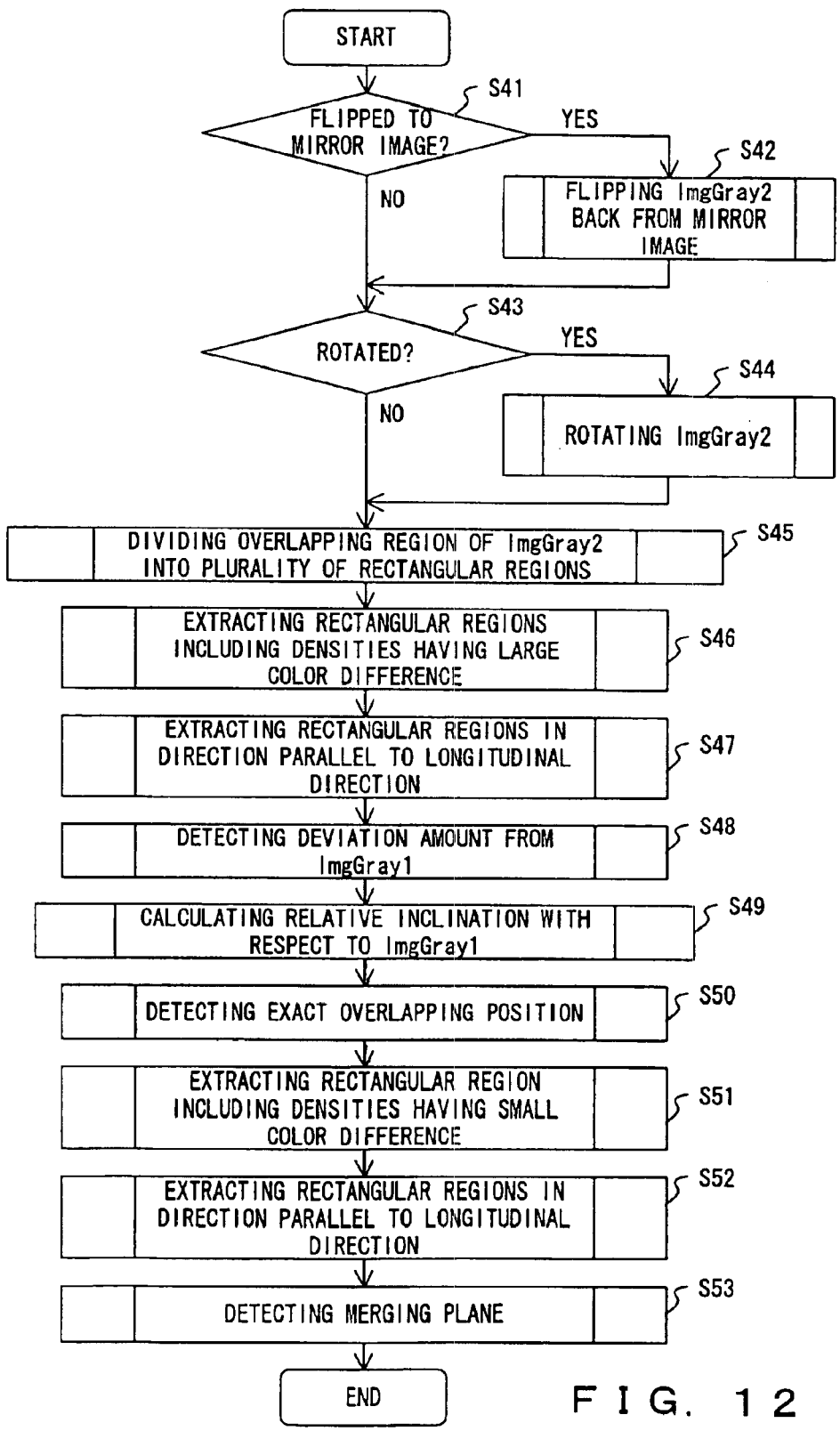
FIG. 12 is a flowchart showing the details of the process performed in step S22 of FIG. 7.

FIG. 12 is a flowchart showing the details of the process performed in step S22.

In the process performed in step S22, grayscale image data having a single color component (ImgGray1 (x,y)) 11, ImgGray2 (x,y) 21), and the presence/absence of mirror image flipping, a rotation angle, and coordinate data of an overlapping region, which are output in step S21, are received as arguments.

As described above, the process in the second step is performed by using grayscale image data having a single color component. Firstly, the overlapping region of reduced images, which is detected in step S21, is corresponded to the overlapping region of grayscale images based on the above described presence/absence of mirror image flipping, rotation angle, and coordinates of the overlapping region.

That is, if mirror image flipping must be first performed ("YES" in step S41), ImgGray(x,y) 21 is flipped back from a mirror image (step S42).

Next, if the image must be rotated ("YES" in step S43), ImgGray2 (x,y) 21 is rotated by the angle detected in step S21 (step S44).

Figures 13A, 13B:
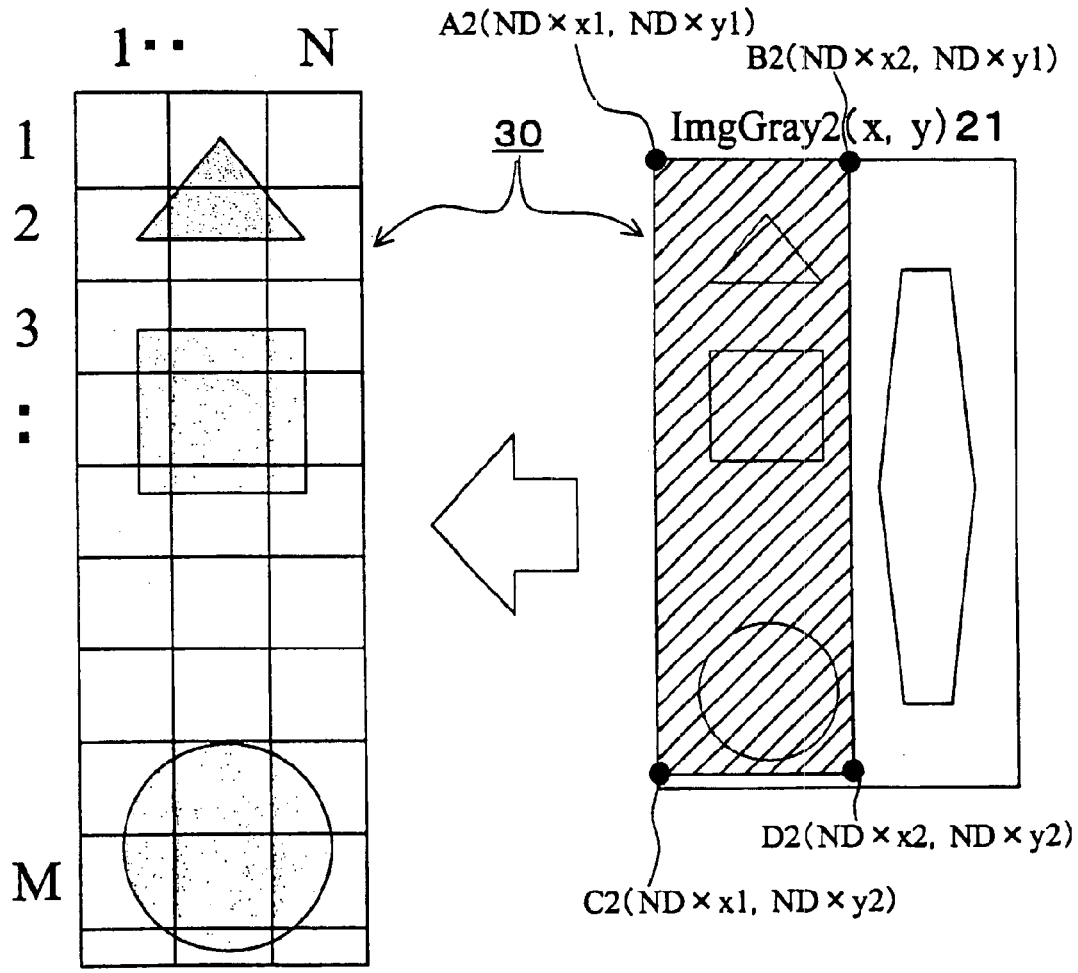
FIG. 13A shows an overlapping region corresponding to ImgGray2(x,y)
FIG. 13B shows the state where the overlapping region shown in FIG. 13A is divided into a plurality of rectangular areas.

Then, in step S45, the coordinates of the overlapping region of reduced images, which are detected in step S21, are corresponded to the coordinates of ImgGray1 (x,y) 11 and ImgGray2 (x,y) 21 before being reduced. If a reduction ratio is, for example, 1/ND, the detected coordinates are multiplied by ND. Assuming that the coordinates of the overlapping region of ImgGray2'(x,y) 22 are A2'(x1,y1), B2'(x2,y1), C2'(x1,y2), D2'(x2,y2), the coordinates before the reduction are respectively A2(ND×x1, ND×y1), B2(ND×x2, ND×y1), C2(ND×x1, ND×y2), D2(ND×x2, ND×y2) (the overlapping region 30 corresponded to ImgGray2(x,y) 21 shown in FIG. 13A is obtained).

Next, the overlapping region 30 that is corresponded to the coordinates of ImgGray2(x,y) 21 is divided into a plurality of regions. Here, the overlapping region 30 is divided into rectangular regions of M rows×N columns as exemplified in FIG. 13B. However, the rectangular regions may be other shapes such as quadrilaterals, circles, etc. Accordingly, a divided region is referred to not as a square region, but as a rectangular region, although the shape of each divided region is a square in the example shown in this figure.

Next, a rectangular region that includes many density components having a large color difference (hereinafter referred to as a first rectangular region) is extracted from the divided rectangular regions (step S46)

This is implemented as follows: each of the rectangular regions is reduced, for example, to 1/NS, a reduced image is put through a difference filter, and lines or frames within the image are highlighted. Next, an outline is traced. If a predetermined number or more of lines or frames are included, and if they have a predetermined length or longer, this rectangular region is extracted as the first rectangular region. Note that values expected to be appropriate are preset as the predetermined values.

For instance, in the example shown in FIG. 13B (FIG. 14A), a color difference is large in a boundary between a background color and a graphic (a square, a triangle, or a circle). Accordingly, if rectangular regions that broadly include such a boundary portion are extracted, for example, rectangular regions diagonally shaded in FIG. 14B are extracted as the first rectangle regions.

Since a color difference is large in a boundary between a background and a man, a mountain, a tree, a river, etc. in an actual photo image, etc., a rectangular region including such color components is extracted as the first rectangular region.

Region extraction is not limited to the above described method extracting a rectangular region based on the magnitude of a color difference. For example, if an image using a luminance component is used, a rectangular region having a large luminance difference is extracted.

If an image matching is performed by using a rectangular region having a large color difference, a disparity significantly varies depending on whether a position is either an exact overlapping position or a position that is not an exact overlapping position. For example, with a matching method using Hamming distance, Euclidean distance, etc., the value at an exact overlapping position becomes small, and the value at a position that is not an exact overlapping position becomes large.

Accordingly, the first rectangular regions extracted in step S46 are suitable for detecting an exact overlapping position. However, there is no need to use all of the regions. Some of them are selected and used, for example, as explained in step S47.

In step S47, rectangular regions used to detect an exact overlapping position are selected from among the first rectangular regions extracted in step S46 in a direction parallel to the longitudinal direction (particularly, a line connecting the coordinates A2 and C2 in FIG. 13A) of the overlapping region 30.

Figures 15A, 15B:
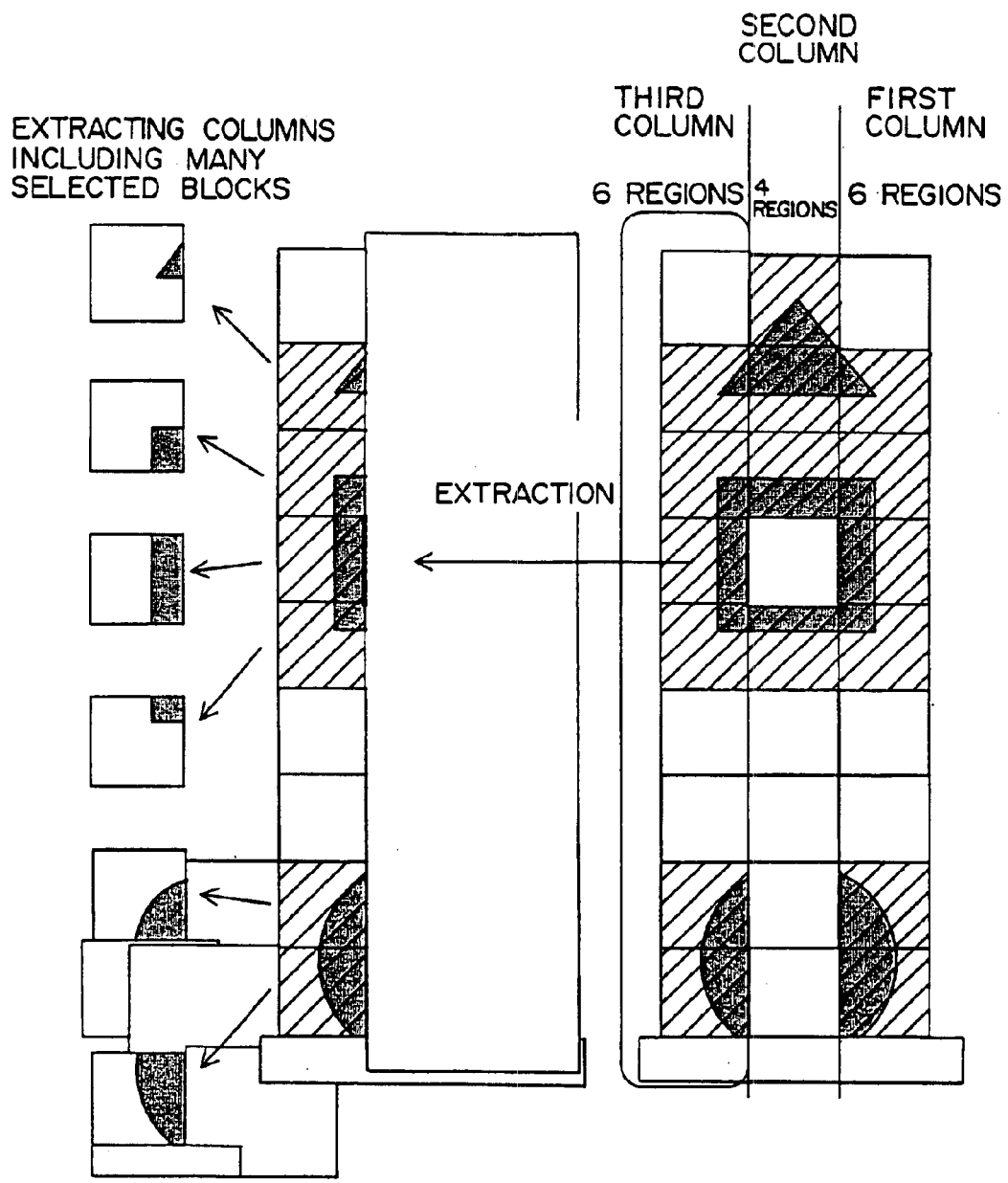
FIGS. 15A and 15B shows the state where a rectangular region used to detect an exact overlapping position is selected from among extracted rectangular regions in a direction parallel to the longitudinal direction of an overlapping position.

If such a selection is made in the example shown in FIG. 14B, the first to the third columns are extracted as shown in FIG. 15A. In such a case, a column that includes the largest number of first rectangular regions is selected.

However, the right and the left columns include the first rectangular regions the numbers of which are the same (6) in the example shown in FIG. 15A. If a plurality of columns include the largest number of first column regions as described above, the column closest to the line connecting the coordinates A2 and C2 in FIG. 13A is selected. Accordingly, the left column is selected as shown in FIG. 15B.

Figures 16A, 16B:
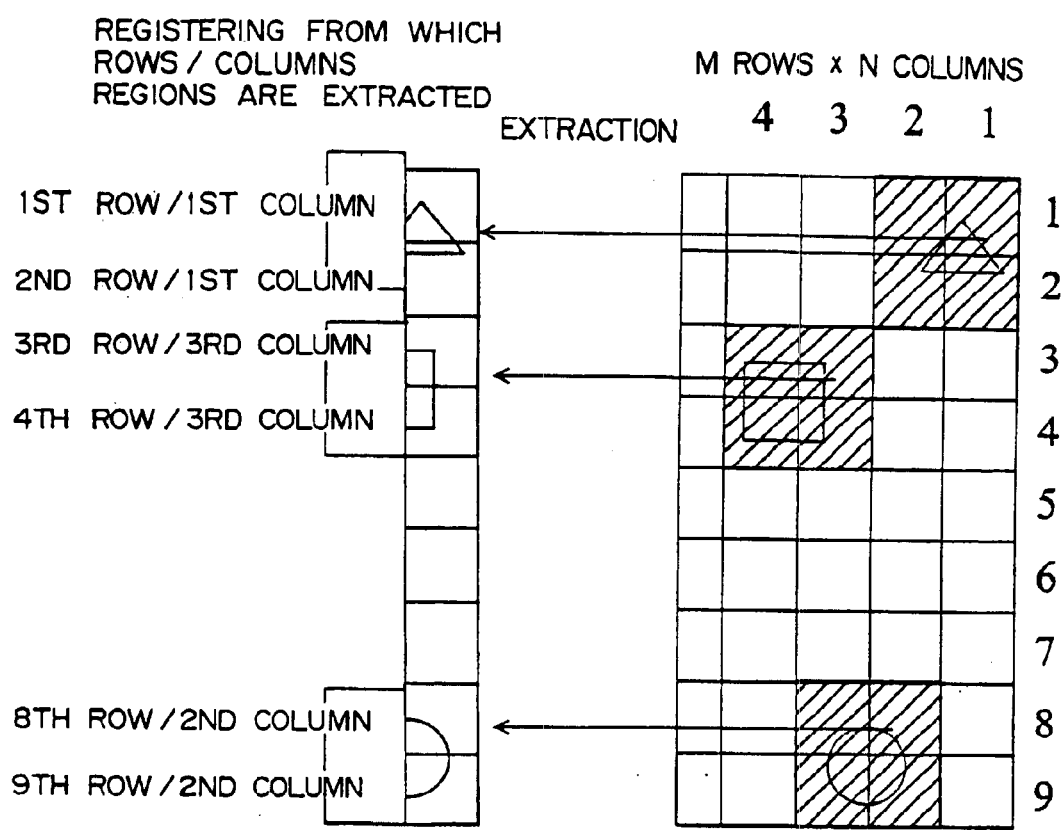
FIGS. 16A and 16B show the state where rectangular regions used to detect an exact overlapping position are selected from a plurality of columns.

If the number of first rectangular regions included in a selected column is small (for example, in the case where a required number is set to 6 or more), rectangular regions are extracted also from other columns. However, if rectangular regions are extracted from a plurality of columns as described above, the number of rectangular regions used to detect an exact overlapping position can possibly become too large. In this case, two or more rectangular regions are not to be extracted from one row, since the processing time required for the matching increases. FIGS. 16A and 16B exemplify the state where the first rectangular regions are extracted from a plurality of columns as described above.

In the example shown in FIG. 16A, the second and the third columns are columns that include the largest number of extracted first rectangular regions (indicated by being diagonally shaded). However, since the numbers of the first rectangular regions included in both of these columns are as small as 4, first rectangular regions are to be extracted from a plurality of columns. Two or more first rectangular regions are not extracted from one row as described above.

Therefore, if a plurality of first rectangular regions exist in one row, any of the plurality of first rectangular regions is selected. Then, from which rows/columns the first rectangular regions are extracted is registered.

In the example shown in FIG. 16B, 6 first rectangular regions in the 1st row/the 1st column, the 2nd row/the 1st column, in the third row/the third column, the fourth row/the third column, the eighth row/the second column, the ninth row/the second column are selected.

In the meantime, if the number of first rectangular regions included in a selected column is too large inversely to the above described case, or if a processing time is desired to be further reduced, the number of first rectangular columns included in that column may be reduced. However, the first rectangular regions to be reduced are selected (selected broadly from upward to downward) so that the first rectangular regions included in the column do not concentrate in an upper or lower half of the column as a result of the reduction.

Next, a deviation from ImgGray1(x,y) 11 is detected for each rectangular region selected from among the first rectangular regions (step S48). Namely, a matching is performed to detect an exact overlapping position while shifting the image in units of one pixel upward, downward, right, and left from the rough overlapping position detected with the process in the first step (step S21). The matching method used here is similar to that in step S21.

Here, if the image has an inclination, the exact overlapping position detected for each rectangular region should deviate from the rough overlapping position to the right or the left (upward or downward)

Figure 17:
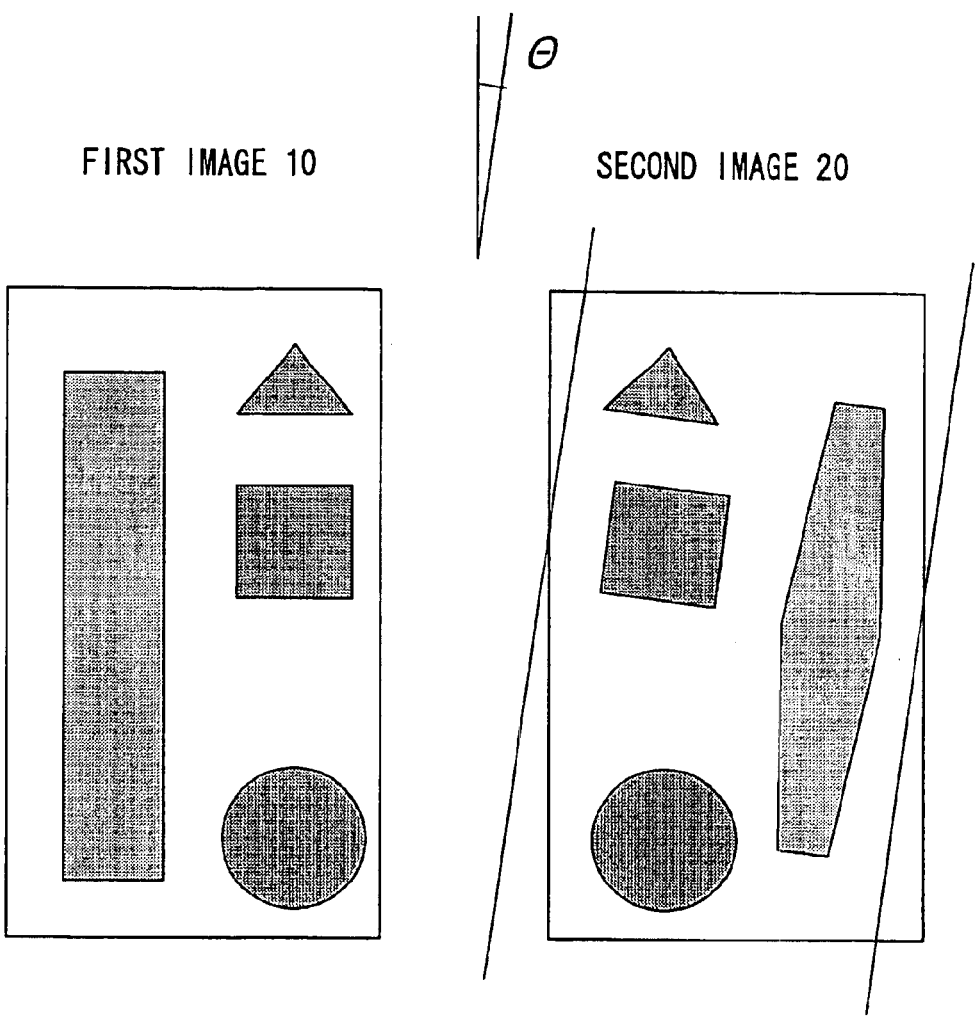
FIG. 17 shows the state where the second image inclines toward the first image.
Figure 18:
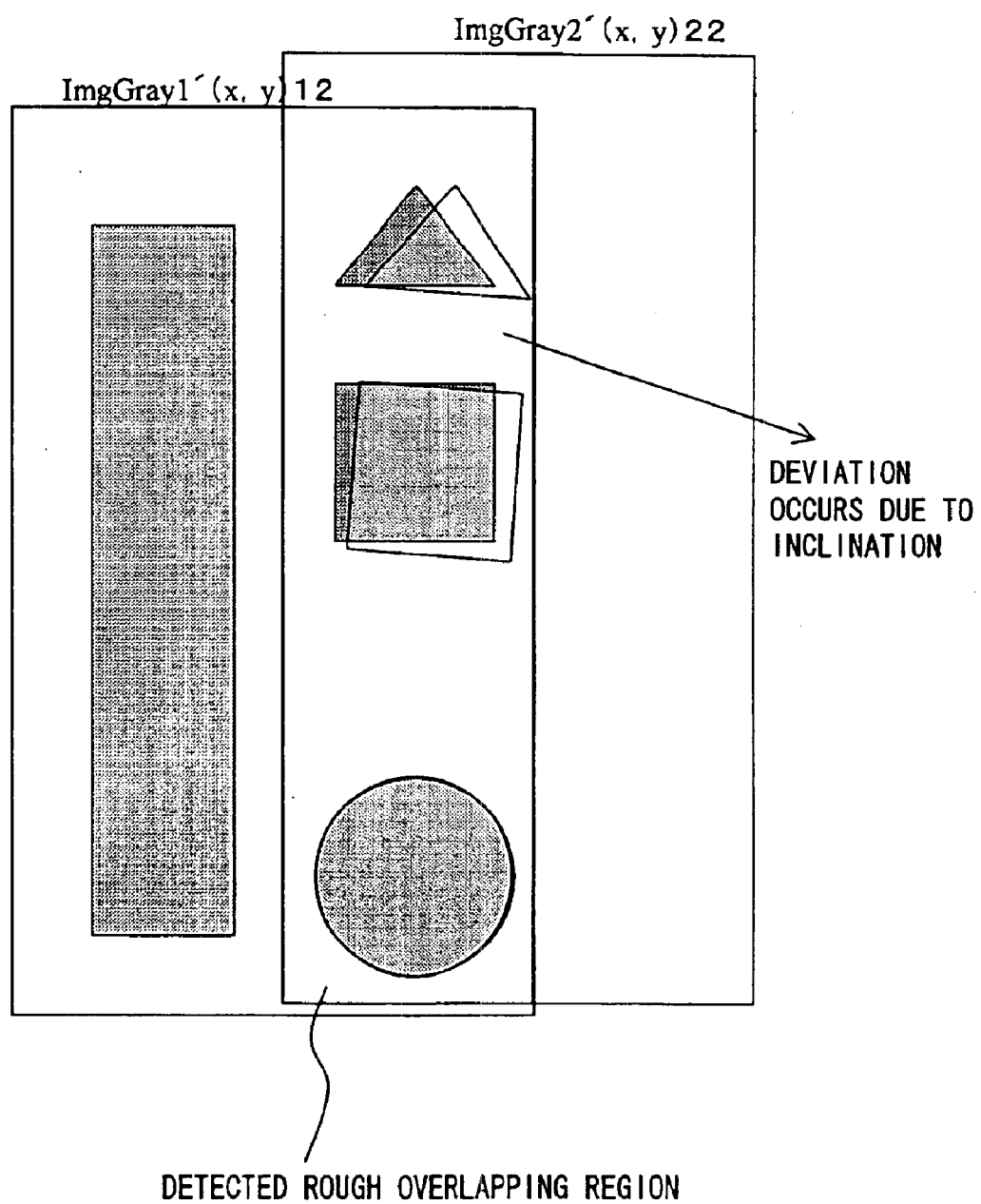
FIG. 18 shows the state where a deviation occurs when a rough overlapping region is detected with a reduced image in the case where an image inclines.

For example, if the second image inclines θ degrees toward the first image as shown in FIG. 17 when being originally scanned, deviations in accordance with the inclination occur, for example, as shown in FIG. 18. The reason is that the position at which the distance becomes the minimum is obtained as a whole without considering the inclination in the process using the above described reduced image in step S21.

In the example shown in FIG. 18, the deviations become larger in an order of a circle, a square, and a triangle due to the inclination.

In the meantime, if a matching is performed for each rectangular region, such a deviation due to an inclination does not occur. Therefore, an almost exact inclination of the second image can be calculated by selecting rectangular regions in a direction parallel to the longitudinal direction (particularly, the line connecting the coordinates A2 and C2 in FIG. 13A) of the overlapping region 30, and by calculating the amount of deviation from the first image for each rectangular region.

An example of the method calculating the inclination of an image with a regression analysis is described below.

Figure 19:
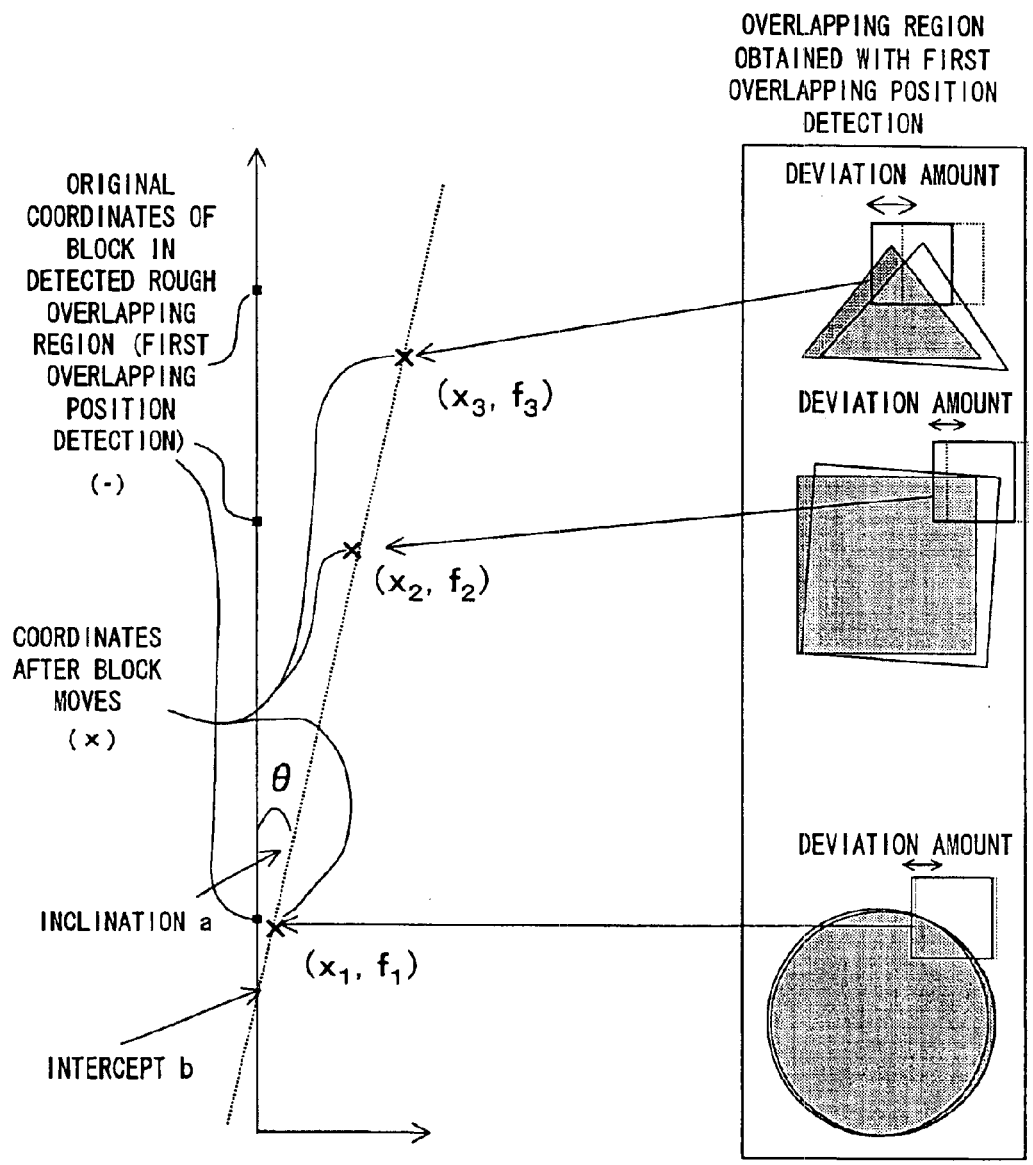
FIG. 19 is a diagram for explaining a method detecting an inclination angle by using a regression analysis.

FIG. 19 shows the original coordinates (indicated by black squares) of an overlapping region obtained with the first overlapping position detection, and the coordinates (indicated by crosses) of a rectangular region obtained with the exact overlapping position detection. Here, assume that an equation of a straight line to be obtained is $$y(x)=ax+b$$

where a is a slope of the straight line, and b is an intercept.

Also assume that deviations between the coordinates obtained with the exact overlapping position detection and the original coordinates are $(x_i, f_i)$ (i=1, 2, . . . , n). n indicates the number of rectangular regions. Here, n=3.

overlapping position can be detected for each rectangular region.

That is, an exact overlapping position detected for each rectangular region deviates from a rough overlapping position to the right or the left (or upward or downward), if the second image inclines. If the second image inclines toward the first image in a clockwise direction as exemplified in FIG. 19, the rectangular region (the triangle portion) extracted from the vicinity of the first row shown in FIG. 15A deviates to the right significantly, but the rectangular region (the circle portion) extracted from the vicinity of the M row deviates slightly. If the deviations of the blocks (rectangular regions) change toward the right and left in proportion, it is proved that ImgGray2(x,y) 21 inclines θ degrees.

Therefore, a deviation is first detected for each rectangular region in step S48, and the amounts of the detected deviations are plotted on X and Y axes.

Then, in step S49, a slope of a straight line is calculated with a method such as a regression analysis, etc. by using the process result of step S48, so that the inclination of ImgGray2(x,y) 21 relative to ImgGray1(x,y) 11 can be obtained.

As described above, the magnitude of relative

Assume that a residual between $f_i$ and $y(x_i)$ at each point is $$e(x_i)=y(x_i)-f_i=(ax_i+b)-f_i \ (i=1, 1, \ldots, n)$$

In this case, the square sum J of the residual results in $$J = \sum_{i=0}^{n} e^2(x_i) = \sum_{i=0}^{n} \{y(x_i) - f_i\}^2$$

where J is an evaluation function. The values of a and b are set so that J becomes a minimum. Namely, J is partially differentiated as follows for a and b.

$$\frac{\partial J}{\partial a} = 0$$

$$\frac{\partial J}{\partial b} = 0$$

By calculating a from the above provided two equations, the slope of the straight line can be obtained. Furthermore, assuming that an inclination angle is θ, θ can be obtained from the slope a of the straight line by using an arc tangent.

Next, in step S50, an exact overlapping position of the two images is detected. If ImgGray2(x,y) 21 does not incline relatively to ImgGray1(x,y) 11, an exact overlapping position is detected from the deviation detected for each rectangular region (step S50). A rectangular region the distance of which becomes a minimum is defined to be an overlapping position as a result of a matching between ImgGray1 (x,y) 11 and the rectangular region.

Figure 20:
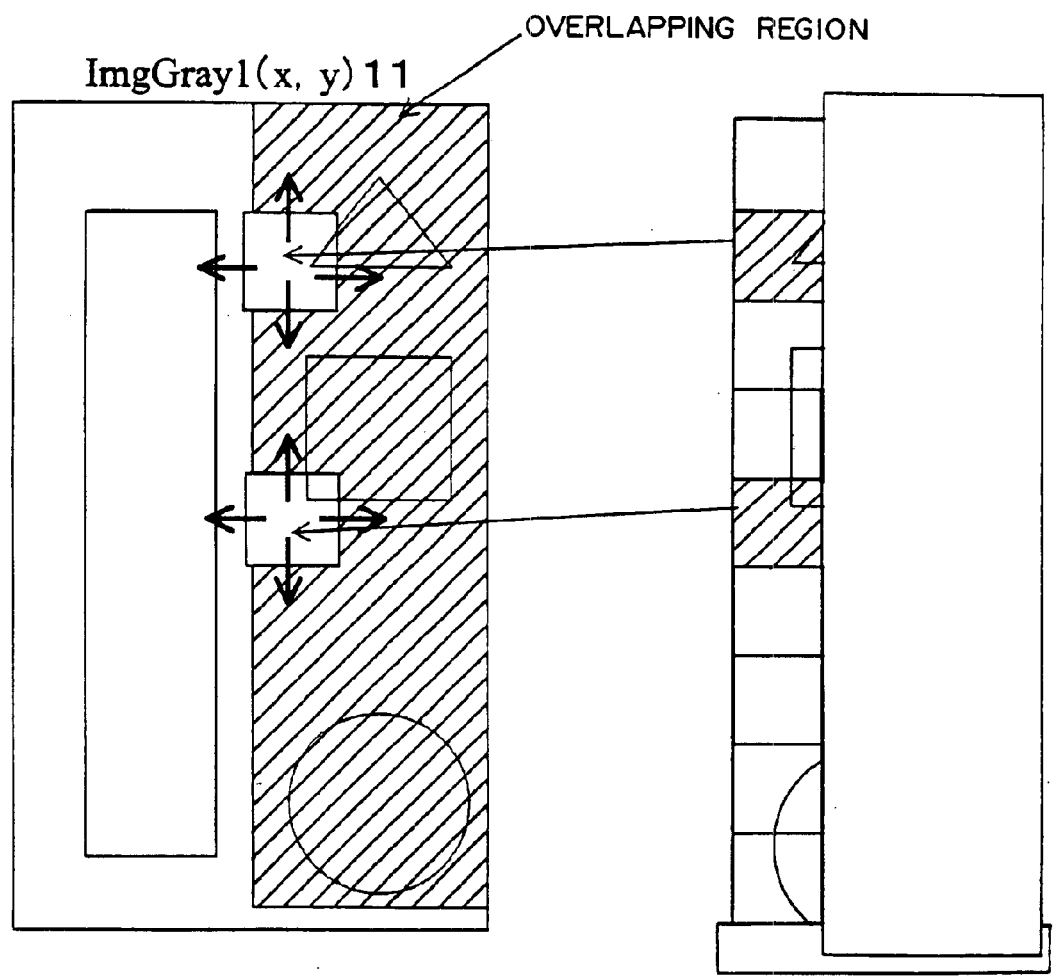
FIG. 20 shows the state where an exact overlapping position is detected for each rectangular area by using a rectangular region used to detect an exact overlapping position.

If the processes in steps S48 and S49 are not performed, an exact overlapping position is detected for each of the rectangular region extracted in step S47 as shown in FIG. 20 (step S50). This is implemented by performing a pixel matching with ImgGray1(x,y) 11 while shifting each rectangular region in units of one pixel upward, downward, right, and left from the overlapping position detected in step S21. Although the matching method itself is similar to that in step S21, an exact overlapping position is calculated for each rectangular region. For example, if Hamming distance, Euclidean distance, etc. is used, the position the distance of which is calculated to be a minimum is defined to be an exact overlapping position. Or, a certain threshold value is arranged, and an average of overlapping positions calculated from rectangular regions the distances of which are equal to or smaller than the threshold value may be taken.

With the above described process, an exact overlapping position of two images can be detected, even if the second image inclines relatively to the first image. This detection result is output to the process in the third step (step S23).

Next, a merging plane of the two images (a region to become a joint: a region for which a synthesis process is to be performed) is obtained with the processes of steps S51 through S53.

Conventionally, a region having a large color difference, which is extracted in the above described step S46, etc., is used for a matching process and as a merging plane. If so used, however, the following problem arises.

Namely, for example, if an inclination of an image cannot be completely corrected, a joint of images becomes conspicuous when two images are merged by using a region having a large color difference as a merging plane.

In the meantime, in this preferred embodiment, it becomes possible to make a joint of images inconspicuous by using a region having a small color difference as a merging plane as described below, even if merging planes do not exactly match.

Firstly, a rectangular region including many density components having a small color difference (hereinafter referred to as a second rectangular region) is extracted (step S51). This is implemented by reducing each rectangular region to 1/NS, by putting a reduced image through a difference filter, and by highlighting lines or frames within the image. Then, a region having only lines or frames the number of which is equal to or smaller than a predetermined value, and the lengths of which are equal to or shorter than a predetermined value, is extracted as a synthesis process region candidate. Namely, a rectangular region including many density components having a small color difference is extracted from divided rectangular regions as a candidate of a region to be used as a merging plane (the second rectangular region). Note that the above described predetermined values are suitably preset.

Figure 21:
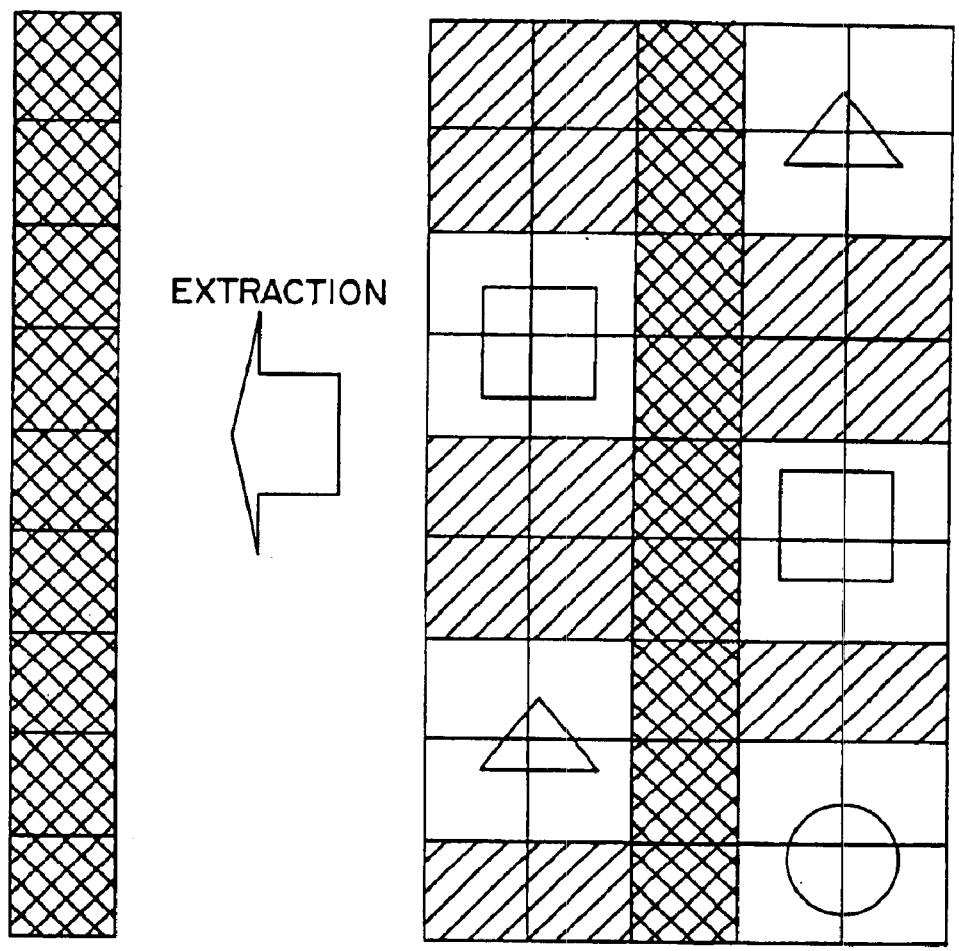
FIG. 21 shows the state where rectangular regions used as a merging plane are extracted.
Figure 22:
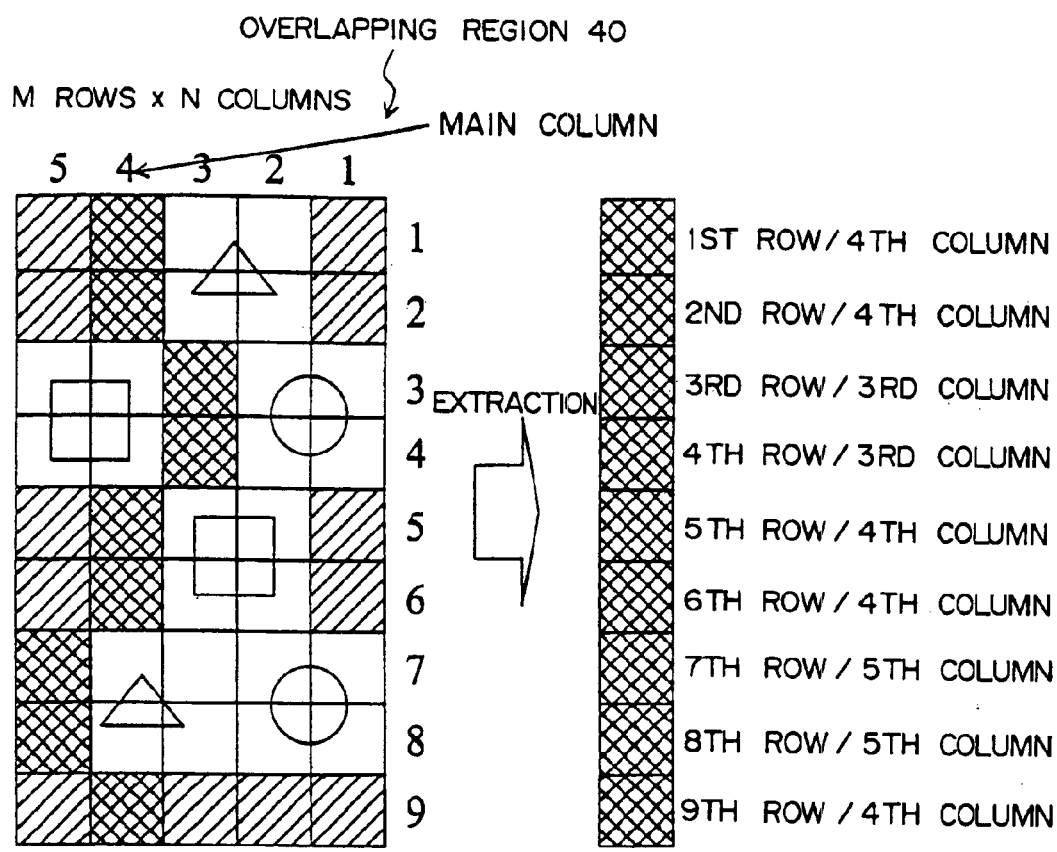
FIG. 22 shows the state where rectangular regions used as a merging plane are extracted also from adjacent columns.

In the examples shown in FIGS. 21 and 22, color differences are large in boundary portions between a background color and graphics (a square, a triangle, and a circle). Therefore, rectangular regions other than the rectangular regions including such boundary portions (portions indicated by being diagonally shaded in FIGS. 21 and 22) are fundamentally extracted as the second rectangular regions. In an actual photo image etc., a portion having a small color difference, such as a background color, is extracted in many cases. In FIGS. 21 and 22, an overlapping region 40 different from the overlapping region 30 is illustrated for ease of understanding of extraction of a rectangular region used as a merging plane.

Next, in step S52, regions are selected from among the second rectangular regions extracted in step S51 in a direction parallel to the longitudinal direction (particularly, the line connecting the coordinates A2 and C2) of the overlapping region 30.

In the example shown in FIG. 21, the column (the third column) including rectangular regions containing many density components having a small color difference (the second rectangular region) is extracted as a region used as a merging plane (the region crosshatched in this figure).

There is no problem in the case where a rectangular region including many density components having a small color difference exists in all of rows in the third column. If not so, for example, if there is a row where the second rectangular region does not exist as in the column (the fourth column) being a main column as exemplified in FIG. 22, rectangular regions including many density components having a small color difference are extracted from the columns at the right and the left of this column for the above described row (the regions crosshatched in FIG. 22 are extracted as regions used as a merging plane as a result).

Namely, since the rectangular regions that are extracted in step S51 and selected in step S52 are used as a merging plane, they must be extracted from all of rows. Furthermore, the rectangular regions must be continuous upward and downward. Therefore, if a row that does not include a rectangular region including many density components having a small color difference exists in a column, such a rectangular region is extracted from the columns at the right and the left of that column for the above described row. For instance, in the example shown in FIG. 22, the column including the largest number of rectangular regions that contain density components having a small color difference is the fourth column. However, since the third, the fourth, the seventh, and the eighth rows do not include a rectangular region including many density components having a small color difference, such rectangular regions are extracted from the columns at the right and the left of that column (namely, the third and the fifth columns). As a result, the rectangular regions selected in step S52 result in regions indicated by being crosshatched in FIG. 22. At this time, from which rows/columns the rectangular regions are extracted is registered.

Furthermore, if a rectangular region including many density components having a small color difference does not exist also in the right and the left columns, a rectangular region including a predetermined number of density components having a large color difference may be selected.

The reason is that, if rectangular regions used as a merging plane are discontinuous, the synthesis process cannot be performed for the discontinuous portions and a joint becomes conspicuous.

Lastly, in step S53, continuous regions extracted in step S52 are determined as a merging plane (a joint) of the two images.

Then, in the process in the third step (step S23), the scanned images (the first and the second images: for example, full-color images) stored in the memory are read out, and the merging position of the first and the second images is corrected by using 1) the presence/absence of mirror image flipping, 2) the rotation angle, and 3) the inclination, which are detected with the processes in steps S21 and S22.

Figure 24:
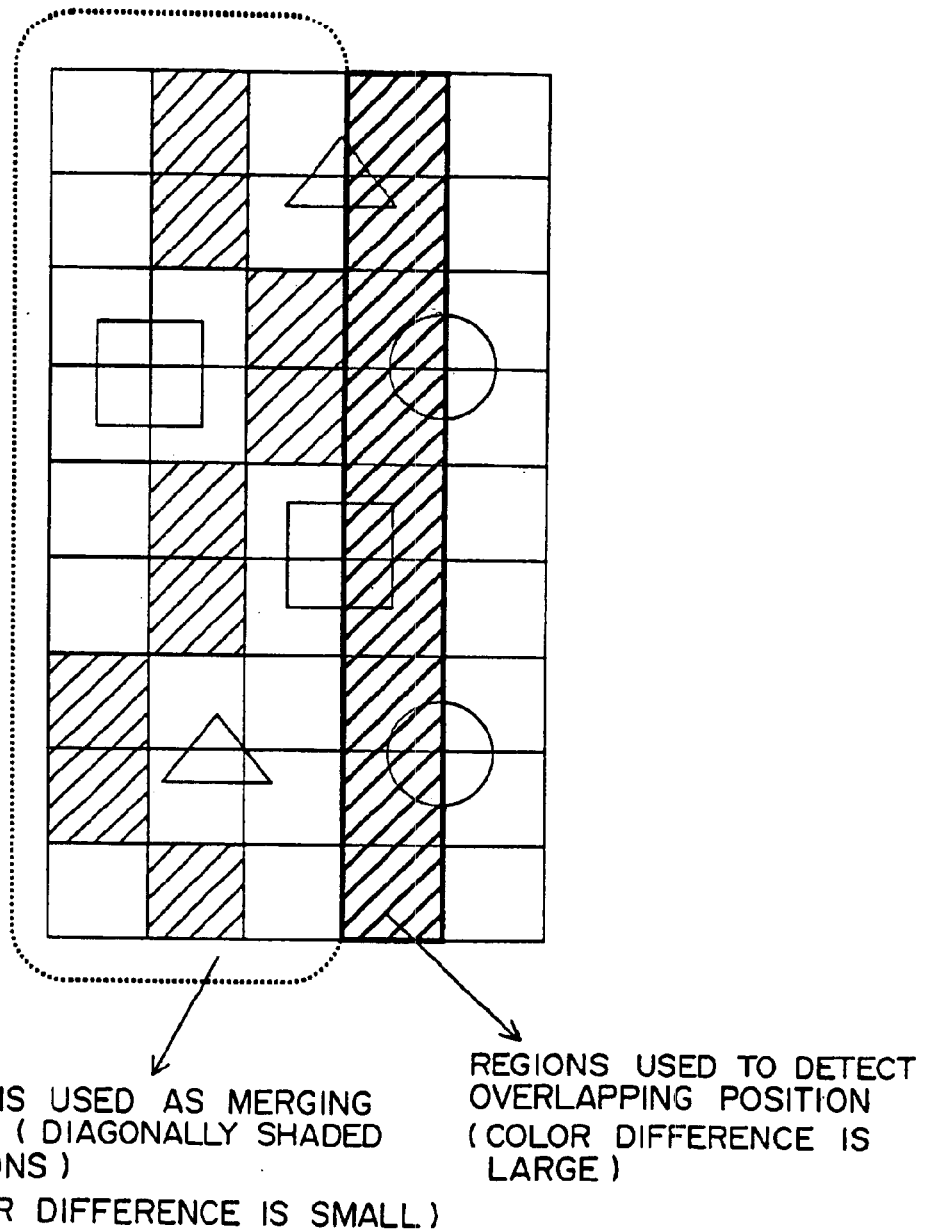
FIG. 24 shows a region used to detect an exact overlapping position and a region used as a merging plane.
Figure 25:
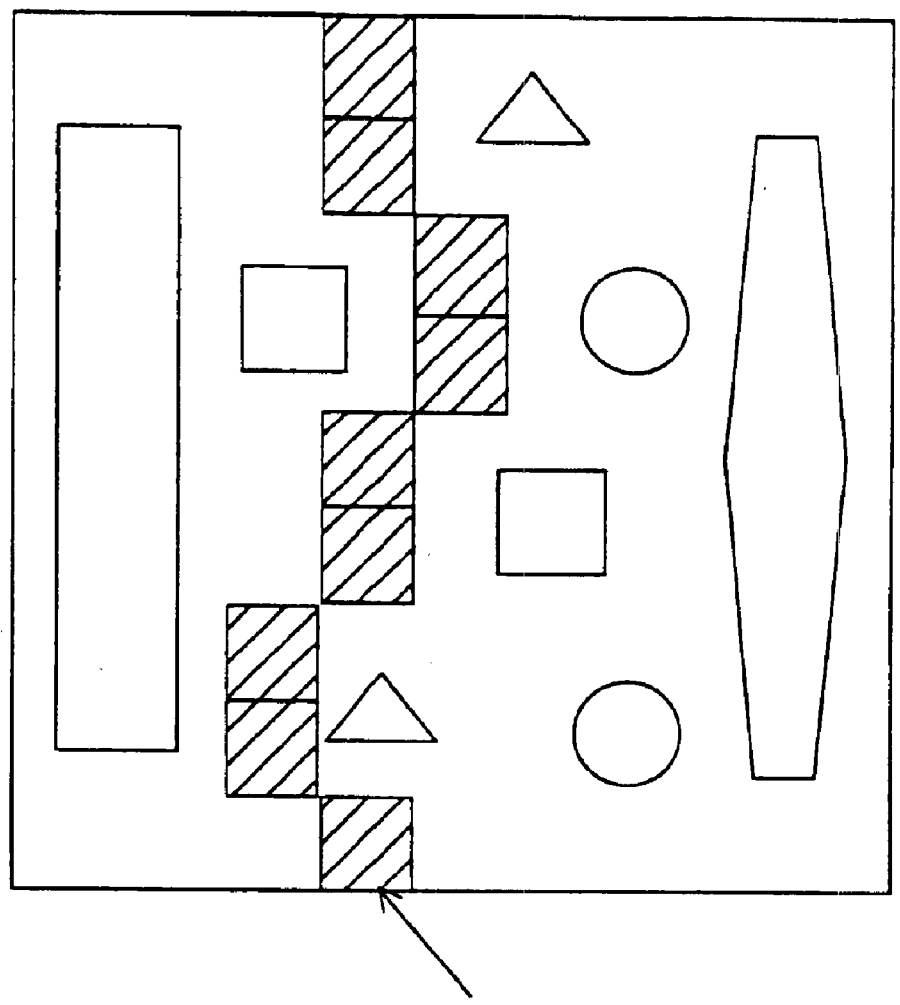
FIG. 25 shows the state where two images are merged by performing a synthesis process without making a joint conspicuous on the merged plane.

Then, the two images are merged by using the exact overlapping position and the rectangular regions used as a merging plane (obtained, for example, as shown in FIG. 24), which are respectively obtained in steps S50 and S53.

Particularly, the synthesis process is performed by using a rectangular region including many density components having a small color difference is used as a merging plane, so that two images can be merged without making a joint conspicuous.

In the process in the third step, data such as the input image data (the first and the second image data: for example, full-color image data) stored in the memory, the presence/absence of mirror image flipping and the rotation angle, which are detected in step S21, and the exact overlapping position of two images and the inclination angle, which are detected in step S22, are received as arguments.

In short, the two input images are merged at the detected exact overlapping position while being corrected with the above described presence/absence of mirror image flipping, rotation angle, and inclination angle, although the details are described as the processes in steps S61 to S71 to be described later. If mirror image flipping is performed, the images are merged while converting the right and the left coordinates of pixels. If a rotation and an inclination are corrected, the images are merged while converting the coordinates of pixels by using a rotation expression (matrix expression).

At that time, the synthesis process is performed in each of the rectangular regions used as a merging plane. With the synthesis process, the pixels of the first and the second images 10 and 20 are averaged for each rectangular region. Otherwise, the first and the second images 10 and 20 may be not averaged but weighted. Then, the merged image is output.

Figure 23:
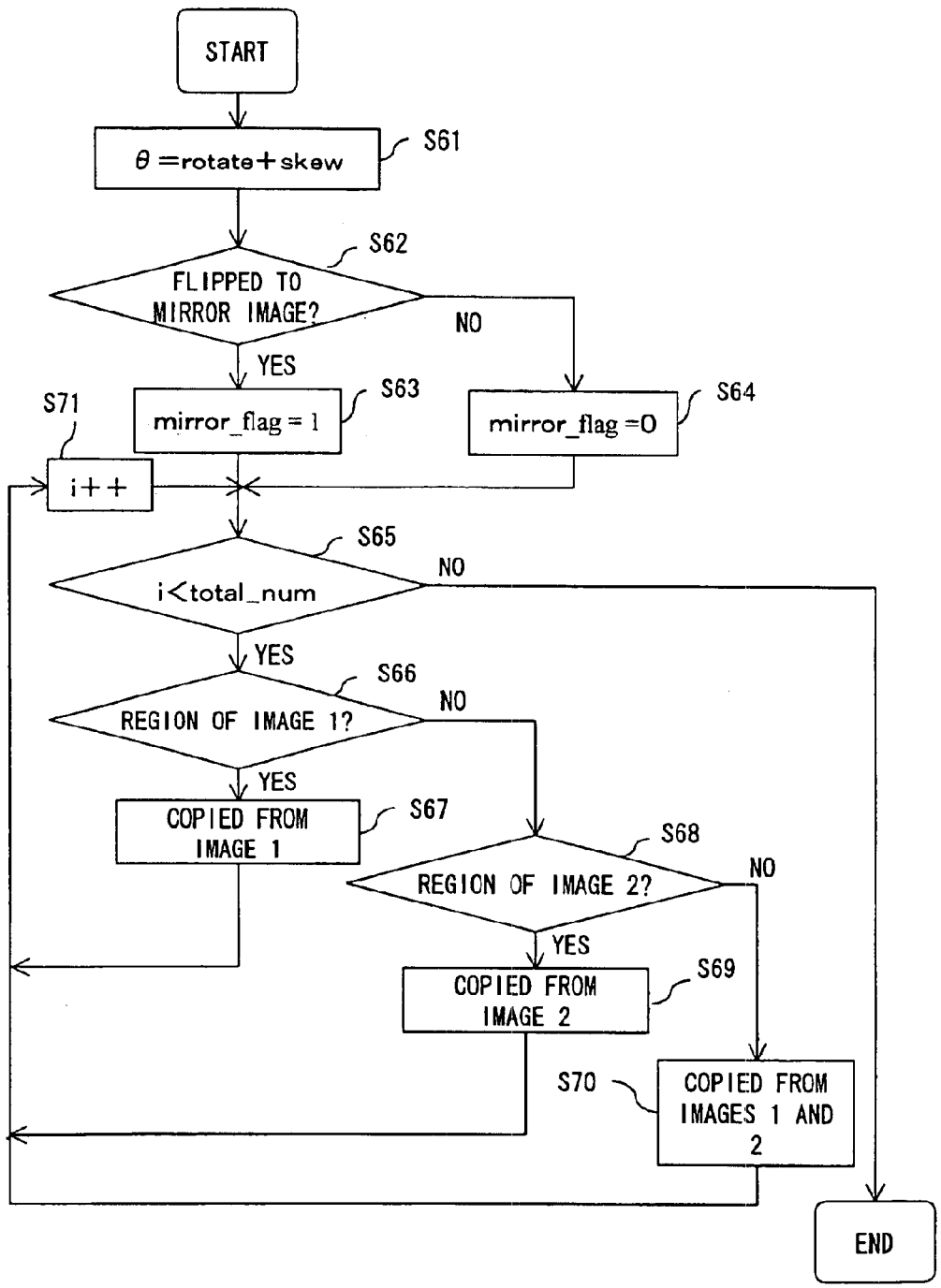
FIG. 23 is a flowchart showing the details of the process performed in step S23 of FIG. 7.

FIG. 23 is a flowchart showing the details of the process performed in the third step (step S23 of FIG. 7).

First of all, assume that the rotation angle (here, data of any of the rotation angles 0, 90, 180, and 270 degrees is used) and the inclination angles, which are detected in the above described steps S21 and S22, are respectively "rotate", and "skew". Then, these two angles are added ($\theta$=rotate+skew) (step S61).

Here, $\theta$ is a correction angle of the second image. Note that both of "rotate" and "skew" may be 0.

Next, the presence/absence of mirror image flipping is determined (step S62). If the image must be flipped back from the mirror image ("YES" in step S62), mirror_flag=1 is set (step S63). Otherwise, ("NO" in step S62), mirror_flag=0 is set (step S64).

Then, a merged image of the two images is generated with the processes in steps S65 to S71 described below.

Prior to the following processes, a memory area for the merged image is secured beforehand, and the values of the first and the second images 10 and 20 are copied. The size of the merged image can be obtained by dividing the two images at the detected overlapping position, and by overlaying the rectangular regions used as a merging plane. As shown in FIG. 24, the left and the right sides of the merging plane are respectively the regions of the first and the second images 10 and 20.

i indicates an address of a pixel of the merged image. If i exceeds the total number of pixels total_num ("NO" in step S65), this process is terminated. If i does not exceed the total number of pixels ("YES" in step S65), the data continues to be copied.

If i is the region of the first image 10 ("YES" in step S66), the pixel value is copied from the first image data (step S67).

Here, if $\theta$!=0, the pixel values of the rotated coordinates, and the pixel values of the coordinates flipped back from a mirror image if the image is flipped to the mirror image must be obtained. To detect the rotated coordinates, the following equations are used.

$$x_1 = X_1 \times \cos\theta - Y_1 \times \sin\theta$$

$$y_1 = X_1 \times \sin\theta + Y_1 \times \cos\theta$$

$(X_1, Y_1)$ represents the coordinate values of the first image in the merged image, whereas $(x_1, y_1)$ represents the coordinate values of the first image. If the image is flipped to a mirror image, $(X_1, Y_1) = (-X_1, Y_1)$ is set.

If $\theta = 0$, $x_1 = X_1$
$y_1 = Y_1$ are set.

If i is the region of the second image 20 ("YES" in step S68), the pixel value is copied from the second image data with a process similar to that performed in step S67 (step S69).

If i is neither the region of the second image 20 ("NO" in step S68), it means that i is a pixel within the rectangular region used as a merging plane, which is extracted in step S52. In this case, a pixel value of the merged image is determined from the pixel values of the first and the second images (the synthesis process is performed) as will be described below.

Assume that the pixel values of the first and the second images are respectively "value1" and "value2", and their coefficients are "va1" and "va2". In this case, the pixel value M of the merged image is calculated with the following equation.

$$M = va1 \times value1 + va2 \times value2$$

where the coefficients va1 and va2 are values that satisfy va1+va2=1.

Then, the value of i is incremented in step S71, and the above described process is repeatedly performed for the next pixel.

As described above, with the image merging apparatus according to this preferred embodiment, two images can be automatically merged at high speed (by reducing a memory capacity required for the processing) without adding dedicated hardware, even if an image such as a photo, a paper sheet, a graphic, etc., which exceeds a scanner width, is dividedly input a plurality of times, and in which (upward, downward, right, or left) direction a user reads an image with a handheld scanner is not learned. At the same time, it is possible to make a joint inconspicuous.

Figure 26:
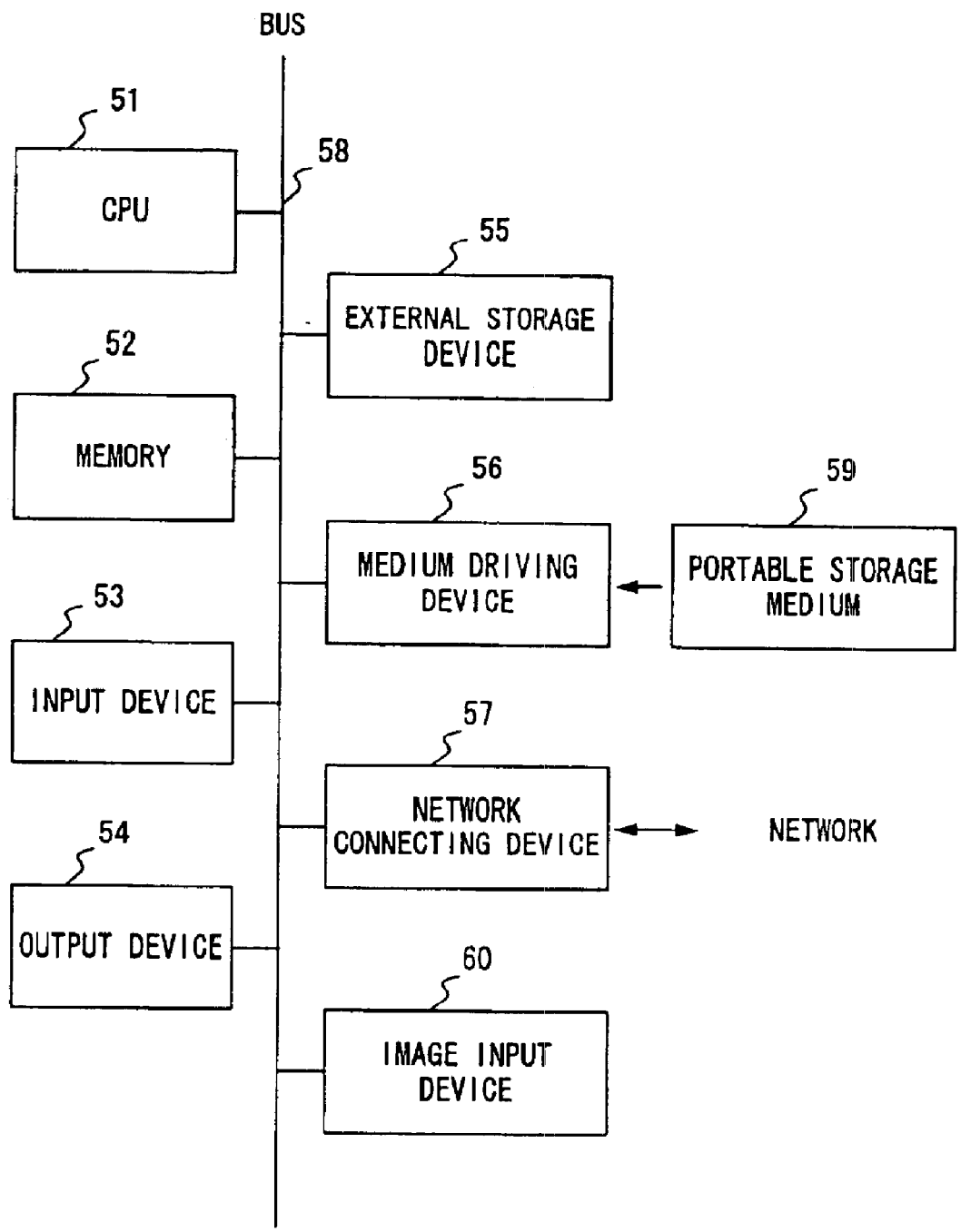
FIG. 26 exemplifies the hardware configuration of an information processing device implementing an image merging apparatus according to the preferred embodiment.

FIG. 26 exemplifies the hardware configuration of an information processing device implementing the image merging apparatus according to this preferred embodiment.

The information processing device implementing the image merging apparatus according to this preferred embodiment is a personal computer (particularly, a notebook computer), a portable information processing device such as a PDA, a handheld PC, etc. as described above.

An information processing device 50 shown in FIG. 26 comprises a CPU 51, a memory 52, an input device 53, an output device 54, an external storage device 55, a medium driving device 56, a network connecting device 57, an image input device 60, etc., which are interconnected by a bus 58. The configuration shown in this figure is merely one example, and the image merging apparatus according to the present invention is not limited to this one.

The CPU 51 is a central processing device that controls the whole of the information processing device 50.

The memory 52 is a memory such as a RAM, etc., which temporarily stores a program or data stored in the external storage device 55 (or onto a portable storage medium 59), for example, when the program is executed or the data is updated. The CPU 51 executes the above described processes by using the program/data read into the memory 52.

The input device 53 is, for example, a keyboard, a mouse, a touch panel and a stylus, a voice input/recognition device, etc.

The output device 54 is, for example, a display, etc.

The external storage device 55 is, for example, a magnetic disk device, an optical disk device, a magneto-optical disk device, etc., and stores a program and data for implementing the capabilities as the above described image merging apparatus.

The medium driving device 56 reads the program/data stored onto the portable storage medium 59. The portable storage medium 59 is, for example, an FD (Floppy Disk), a CD-ROM, a DVD, a magneto-optical disk, etc.

The network connecting device 57 makes a connection to a network, and allows an external information processing device to transmit/receive a program/data, etc.

The image input device 60 is, for example, the above described handheld scanner, etc.

Figure 27:
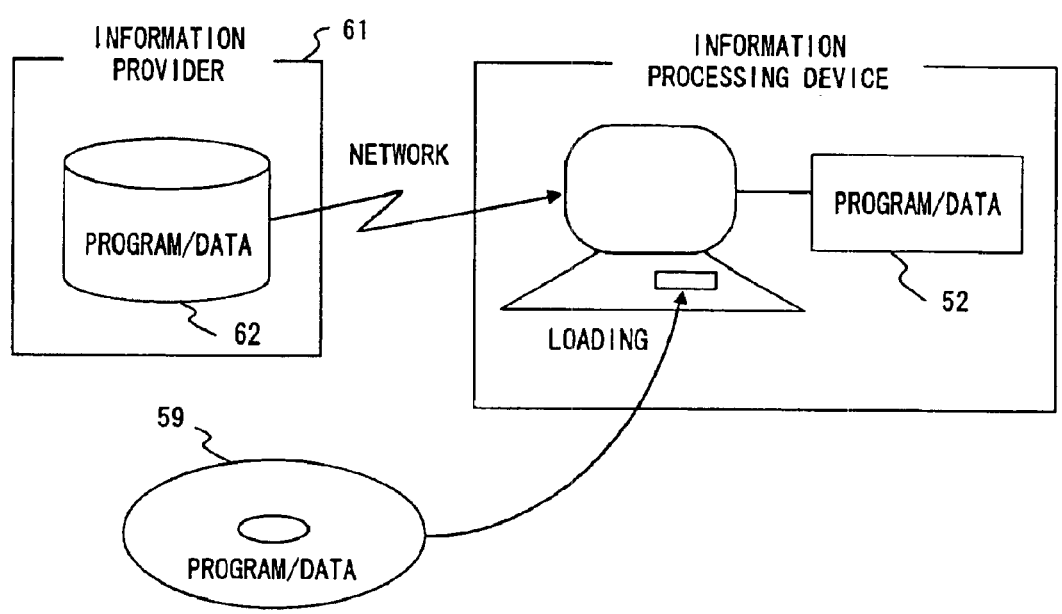
FIG. 27 exemplifies storage media.

FIG. 27 exemplifies storage media.

As shown in this figure, a program, data, etc., which are stored onto the portable storage medium 59 as the above described program and data, may be stored in the memory 52 by being loaded into an information processing device side, and executed. Or, the above described program/data stored in a storage device 62 of a device 61 on an external information provider side may be downloaded via a network (the Internet, etc.) connected by the network connecting device 57.

The present invention may be configured as a storage medium (the portable storage medium 59, etc.) storing the above described program/data, a network (a transmission medium) transmitting the above described program/data, or a transmission signal transmitted via the transmission medium at the time of downloading.

As described above in detail, with the image merging apparatus and method according to the present invention, two images can be automatically merged at high speed without using hardware for detecting the move amount or the proceeding direction of an image input device, even if one image is flipped to a mirror image and/or rotated with respect to another. At the same time, the memory capacity required for the processing can be reduced. This produces a significant effect, particularly when input images are full-color images.

Additionally, with the image merging apparatus and method according to the present invention, a joint between two images can be made inconspicuous.

As a result, the present invention greatly contributes to improvements in the operability of an image input with a handheld scanner, etc., and in a user interface.

What is claimed is:

1. An apparatus merging input images that are dividedly read a plurality of times from an input device, comprising:

a first overlapping position detecting unit detecting a rough overlapping region of the plurality of pieces of read input image data;

a second overlapping position detecting unit dividing the rough overlapping region detected by said first overlapping position detecting unit into a plurality of rectangular regions, and extracting a rectangular region used to detect an exact overlapping position, and a rectangular region used as a merging plane from the plurality of divided rectangular regions; and an image merging unit determining the exact overlapping position of the plurality of input images by using the rectangular region used to detect an exact overlapping position, which is detected by said second overlapping position detecting unit, and merging the plurality of input images by performing a synthesis process for the plurality of input images in the rectangular region used as the merging plane.

2. An apparatus merging input images that are dividedly read a plurality of times from an input device, comprising:
- a first overlapping position detecting unit temporarily storing the plurality of pieces of read input image data, generating image data whose data amounts are made smaller than the plurality of pieces of input image data, and detecting a merging position relationship and a rough overlapping region of the plurality of input images;
- a second overlapping position detecting unit dividing, into a plurality of rectangular regions, a region corresponding to the rough overlapping region detected by said first overlapping position detecting unit in grayscale image data having a single color component by using the grayscale image data into which each of the plurality of pieces of read input image data is converted, and extracting a rectangular region used to detect an exact overlapping position and a rectangular region used as a merging plane of the images from among the plurality of rectangular regions; and
- an image merging unit determining the exact overlapping position of the plurality of input images by using the rectangular region used to detect an exact overlapping position, which is detected by said second overlapping position detecting unit, and merging the plurality of input images by performing a synthesis process for the plurality of input images in the rectangular region used as the merging plane of the images.

3. The image merging apparatus according to claim 1, wherein:
- the rectangular region used to detect an exact overlapping position is a rectangular region selected from among rectangular regions including many density components having a large color difference; and
- the rectangular region used as the merging plane of the images is a rectangular region selected from among rectangular regions including many density components having a small color difference.

4. The image merging apparatus according to claim 2, wherein:
- the rectangular region used to detect an exact overlapping position is a rectangular region selected from among rectangular regions including many density components having a large color difference; and
- the rectangular region used as the merging plane of the images is a rectangular region selected from among rectangular regions including many density components having a small color difference.

5. The image merging apparatus according to claim 1, wherein
- said second overlapping position detecting unit calculates a relative inclination of the plurality of input images with a regression analysis method based on a deviation between the rough overlapping position and the exact overlapping position obtained by using the rectangular region used to detect an exact overlapping position.

6. The image merging apparatus according to claim 2, wherein
- said second overlapping position detecting unit calculates a relative inclination of the plurality of input images with a regression analysis method based on a deviation between the rough overlapping position and the exact overlapping position obtained by using the rectangular region used to detect an exact overlapping position.

7. A method merging input images that are dividedly read a plurality of times from an input device, comprising:
- detecting a rough overlapping region of the plurality of pieces of read input image data;
- dividing the detected rough overlapping region into a plurality of rectangular regions, and extracting a rectangular region used to detect an exact overlapping position, and a rectangular region used as a merging plane from among the plurality of divided rectangular regions; and
- determining the exact overlapping position of the plurality of input images by using the extracted rectangular region used to detect an exact overlapping position, and merging the plurality of input images by performing a synthesis process for the plurality of input images in the rectangular region used as the merging plane.

8. A method merging input images that are dividedly read a plurality of times from an input device, comprising:
- temporarily storing the plurality of pieces of read input image data, generating image data whose data amounts are made smaller than the plurality of pieces of input image data, and detecting a merging position relationship and a rough overlapping region of the plurality of input images by using the generated image data;
- dividing, into a plurality of rectangular regions, a region corresponding to the detected rough overlapping region in grayscale image data having a single color component by using the grayscale image data into which each of the plurality of pieces of read input image data is converted, and extracting a rectangular region used to detect an exact overlapping position, and a rectangular region used as a merging plane of the images from among the plurality of rectangular regions; and
- determining the exact overlapping position of the plurality of input images by using the plurality of pieces of read input image data and the extracted rectangular region used to detect an exact overlapping position, and merging the plurality of input images by performing a synthesis process for the plurality of input images in the rectangular region used as the merging plane of the images.

9. A computer-readable storage medium on which is recorded a program for causing a computer to execute a process when being used by the computer, the process comprising:
- inputting images that are dividedly read a plurality of times from an input device;
- detecting a rough overlapping region of the plurality of pieces of read input image data;
- dividing the detected rough overlapping region into a plurality of rectangular regions, and extracting a rectangular region used to detect an exact overlapping position and a rectangular region used as a merging plane from among the plurality of divided rectangular regions; and
- determining the exact overlapping position of the plurality of input images by using the extracted rectangular region used to detect an exact overlapping position, and merging the plurality of input images by performing a synthesis process for the plurality of input images in the rectangular region used as the merging plane.

10. A computer-readable storage medium on which is recorded a program for causing a computer to execute a process when being used by the computer, the process comprising:
- inputting images that are dividedly read a plurality of times from an input device;

temporarily storing the plurality of pieces of read input image data, generating image data whose data amounts are made smaller than the plurality of pieces of input image data, and detecting a merging position relationship and a rough overlapping region of the plurality of input images by using the generated image data;

dividing, into a plurality of rectangular regions, a region corresponding to the detected rough overlapping region in grayscale image data having a single color component by using the grayscale image data into which each of the plurality of read input image data is converted, and extracting a rectangular region used to detect an exact overlapping position and a rectangular region used as a merging plane of the images from among the plurality of rectangular regions; and determining the exact overlapping position of the plurality of input images by using the plurality of read input image data and the extracted rectangular region used to detect an exact overlapping position, and merging the plurality of input images by performing a synthesis process for the plurality of input images in the rectangular region used as the merging plane of the images.

* * * * *